(12) United States Patent
Nishida et al.

(10) Patent No.: US 8,965,941 B2
(45) Date of Patent: Feb. 24, 2015

(54) FILE LIST GENERATION METHOD, SYSTEM, AND PROGRAM, AND FILE LIST GENERATION DEVICE

(71) Applicant: Hitachi Solutions, Ltd., Tokyo (JP)

(72) Inventors: Shimpei Nishida, Tokyo (JP); Takashi Imai, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 184 days.

(21) Appl. No.: 13/753,208

(22) Filed: Jan. 29, 2013

(65) Prior Publication Data

US 2013/0212136 A1    Aug. 15, 2013

(30) Foreign Application Priority Data

Feb. 15, 2012   (JP) .................................. 2012-030149

(51) Int. Cl.
 *G06F 17/30* (2006.01)
(52) U.S. Cl.
 CPC .... *G06F 17/30091* (2013.01); *G06F 17/30144* (2013.01); *G06F 17/3007* (2013.01)
 USPC .......................................... 707/830; 707/828
(58) Field of Classification Search
 CPC .............. G06F 17/30887; G06F 17/30; G06F 17/3007; G06F 17/30327; G06F 17/30336
 USPC ................................................ 707/828–830
 See application file for complete search history.

(56) References Cited

U.S. PATENT DOCUMENTS

| | | | | |
|---|---|---|---|---|
| 5,845,290 A | * | 12/1998 | Yoshii | 1/1 |
| 6,330,606 B1 | * | 12/2001 | Logue et al. | 709/226 |
| 7,243,369 B2 | * | 7/2007 | Bhat et al. | 726/6 |
| 7,765,277 B1 | * | 7/2010 | Meyer et al. | 709/217 |
| 7,854,006 B1 | * | 12/2010 | Andruss et al. | 726/24 |
| 2004/0068523 A1 | | 4/2004 | Keith, Jr. et al. | |
| 2010/0262638 A1 | * | 10/2010 | Fitzgerald | 707/822 |
| 2012/0023091 A1 | * | 1/2012 | Fox et al. | 707/709 |

FOREIGN PATENT DOCUMENTS

JP      2006-268456 A      10/2006

OTHER PUBLICATIONS

Calvin C.-Y. Chen et al. "Parallel Breadth-First and Breadth-Depth Traversals of General Trees", Advances in Computing and Informaiton ICCI '90, Springer Berlin Heidelberg, Berlin, Heidelberg, vol. 468, May 23, 1990, pp. 395-404.

* cited by examiner

*Primary Examiner* — Debbie Le
(74) *Attorney, Agent, or Firm* — Mattingly & Malur, PC

(57) ABSTRACT

A file list generation device creates, at high speed, a list of added, changed, or deleted file data by acquiring the directory URLs of search target files from a first storage, counting the number of directories in each layer through analysis of the directory URLs, and, based on the result of the counting, determines a dividing policy to divide a scan target directory scanning operation, which is to be performed with a distributed server cluster. Directories of the search target files are divided in accordance with the determined dividing policy, and a snapshot of a current directory tree is acquired.

16 Claims, 16 Drawing Sheets

| File URL | File name | Last access time | Last update time | File size | Index creation time |

| First row \ Second row | .IDX01/<A> | .IDX01/<B> | .IDX02/<A> | .IDX02/<B> |
|---|---|---|---|---|
| .IDX01/<A> | (*1) | 1 | 5 | 2 |
| .IDX01/<B> | (*2) | (*1) | (*2) | 6 |
| .IDX02/<A> | (*2) | 3 | (*1) | 4 |
| .IDX02/<B> | (*2) | (*2) | (*2) | (*1) |

FIG. 13

| Determination result of S1001\Determination result of S1002 | 1 | 2 | 3 | 4 |
|---|---|---|---|---|
| A | Register first row as deleted file | Register first row as deleted file | Register first row as added file | Register first row as added file |
| B | Same as above | Same as above | Same as above | Same as above |
| C | Search all files under first row, and register files as deleted files | Search all files under first row, and register files as deleted files | Add first row to next scan range, if directory in first row belongs to lowermost layer | Add first row to next scan range, if directory in first row belongs to lowermost layer |
| D | Same as above | Same as above | Same as above | Same as above |

FILE LIST GENERATION METHOD, SYSTEM, AND PROGRAM, AND FILE LIST GENERATION DEVICE

BACKGROUND OF THE INVENTION

1. Field of the Invention

The present invention generally relates to a method, system, program, and device for efficiently generating a file list having search indices to be updated, by efficiently analyzing the layers in a large amount of file data stored in a file server. More particularly, the present invention relates to a method, system, program, and device for efficiently creating a list of added, changed, or deleted file data by comparing file trees of file groups located in two existing directories created in accordance with a common naming rule.

2. Background Art

As the speed of computer performance has become higher, and the capacities of HDDs have become larger in recent years, a huge number of unstructured documents are being created. Therefore, there is an increasing demand for search systems that are capable of accurately retrieving required documents from an enormous number of documents at high speed. To achieve an accurate search result, it is critical that the adding, changing, and deleting operations performed, after the search index creation, on the file data in a file server storing search target unstructured documents be timely reflected by the search indices. In causing the search indices to reflect such operations, a long period of time is required if the search indices about unchanged file data are also updated. Therefore, only the search indices about the file data that have been added, changed, or deleted are normally updated. To do so, it is necessary to create a list of file data that have been added, changed, or deleted.

To satisfy the demand for such search systems, there are file servers each including an interface that stores the histories of operations performed on file data, and provides a list of added, changed, or deleted file data in response to a request from outside. Some other file server provides an interface for holding the file data state at a certain point of time as a "snapshot" in a separate directory, so that a file tree in a past can be accessed.

One of such conventional arts is disclosed in JP Patent Publication (Kokai) No. 2006-268456A.

When a list of added, changed, or deleted file data is created, such an interface can be used if the file server provides a list. However, in the case of a file server that does not include such an interface, all the file data in the search index creation target range existing in the file server need to be scanned to determine whether to perform an updating operation.

Even if the amount of added, changed, or deleted file data is small, all the file data need to be scanned, and therefore, the operation to create a list of added, changed, or deleted file data leads to prolongation of the index updating operation.

To counter this problem, there has been a suggested technique by which the file tree structure in the file server is divided, and scanning operations for those sub trees are performed in parallel, so as to realize a high-speed scan.

SUMMARY OF THE INVENTION

However, the file tree in a file server varies with environments and is difficult to know in advance. Therefore, it is difficult to determine an efficient dividing method. A file server in which indices have already been created once can have a list of indexed files in the system, and a list of added, changed, or deleted file data can be created at high speed.

However, such a list of indexed files also needs to store the hash values of the file data so that a check can be made to determine whether the files have been updated. Therefore, to store the list of indexed files, a disk with a large capacity is required, and the system size increases in proportion to the number of search target files.

The present invention, in order to cope with this situation, provides a file list generation method, system, program, and device that are capable of creating, at high speed, a list of added, changed, or deleted file data, and performing a search index updating operation at high speed, while the system does not store a large amount of indexed file lists including hash values of file data.

To solve the problem as described above, a file list generation method according to the present invention includes: storing index information created about search target files into first storage means; determining a dividing policy to divide a scan target directory scanning operation to be performed with a distributed server cluster, by acquiring the directory URLs of the search target files from the index information stored in the first storage means, and counting the number of directories in each layer through analysis of the directory URLs, the scan target directory scanning operation being divided based on the result of the counting; dividing directories of the search target files in accordance with the determined dividing policy; acquiring a snapshot of the current directory tree of scan target files, and storing the snapshot into second storage means; scanning, in a distributed manner, the search target files in the respective directories in the snapshot of the current directory tree and a snapshot of a directory tree of search target files acquired prior to the determination of the divided policy and stored in third storage means, the scanning being performed with the distributed server cluster on the basis of division units determined in the determining the dividing policy; and comparing the results of the distributed scans, and creating and outputting a list of files that are added, deleted, or changed after the creation of the index information.

Another file list generation method according to the present invention includes: storing index information created about search target files into first storage means; copying the current directory tree of the search target files, and storing the copied current directory tree as a backup directory into second storage means; determining a dividing policy to divide a scan target directory scanning operation to be performed with a distributed server cluster, by acquiring the directory URLs of the search target files from the index information stored in the first storage means, and counting the number of directories in each layer through analysis of the directory URLs, the scan target directory scanning operation being divided based on the result of the counting; dividing the backup directory of the search target files in accordance with the determined dividing policy; scanning, in a distributed manner, the search target files in the respective directories in the backup directory of the current directory tree and a backup directory tree of search target files acquired prior to the determination of the divided policy and stored in third storage means, the scanning being performed with the distributed server cluster on the basis of division units determined in the determining the dividing policy; and comparing the results of the distributed scans, and creating and outputting a list of files that are added, deleted, or changed after the creation of the index information.

The determining the dividing policy includes determining a dividing policy of setting the number of division units as 1 to perform a search target directory scanning operation when the number of directories counted from the highest layer of the directories of the search target files is smaller than a predetermined number, performing a first scan, with each one division unit being layers from a directory in the highest layer to a predetermined layer when the number of directories counted from the highest layer exceeds the predetermined number, and determining a dividing policy to scan lower layers of scan target directories that are found through the first scan, with each one division unit being the depth of one layer.

A file list generation system according to the present invention includes: first storage means that stores index information created about search target files; dividing policy determination means that acquires the directory URLs of the search target files from the index information stored in the first storage means, counts the number of directories in each layer through analysis of the directory URLs, and, based on the result of the counting, determines a dividing policy to divide a scan target directory scanning operation to be performed with a distributed server cluster; means that divides directories of the search target files in accordance with the determined dividing policy, acquires a snapshot of the current directory tree of scan target files, and stores the snapshot into second storage means; file scan means that scans, in a distributed manner, the search target files in the respective directories in the snapshot of the current directory tree and a snapshot of a directory tree of search target files acquired prior to the determination of the divided policy and stored in third storage means, the scan being performed with the distributed server cluster on the basis of division units determined by the dividing policy determination means; and comparison means that compares the results of the distributed scans performed by the file scan means, and creates and outputs a list of files that are added, deleted, or changed after the creation of the index information.

Another file list generation system according to the present invention includes: first storage means that stores index information created about search target files; second storage means that copies the current directory tree of the search target files, and stores the copied current directory tree as a backup directory; dividing policy determination means that acquires the directory URLs of the search target files from the index information stored in the first storage means, counts the number of directories in each layer through analysis of the directory URLs, and, based on the result of the counting, determines a dividing policy to divide a scan target directory scanning operation to be performed with a distributed server cluster; means that divides the backup directory of the search target files in accordance with the determined dividing policy; file scan means that scans, in a distributed manner, the search target files in the respective directories in the backup directory of the current directory tree and a backup directory tree of search target files acquired prior to the determination of the divided policy and stored in third storage means, the scan being performed with the distributed server cluster on the basis of division units determined in the dividing policy determination means; and comparison means that compares the results of the distributed scans performed by the file scan means, and creates and outputs a list of files that are added, deleted, or changed after the creation of the index information.

The dividing policy determination means determines a dividing policy of setting the number of division units as 1 to perform a search target directory scanning operation when the number of directories counted from the highest layer of directories of search target files is smaller than a predetermined number, performs a first scan, with each one division unit being layers from a directory in the highest layer to a predetermined layer when the number of directories counted from the highest layer exceeds the predetermined number, and determines a dividing policy to scan lower layers of scan target directories that are found through the first scan, with each one division unit being the depth of one layer.

A file list generation device according to the present invention includes: dividing policy determination means that acquires the directory URLs of search target files from index information created about the search target files and stored in first storage means, counts the number of directories in each layer through analysis of the directory URLs, and, based on the result of the counting, determines a dividing policy to divide a scan target directory scanning operation to be performed with a distributed server cluster; means that divides directories of the search target files in accordance with the determined dividing policy, acquires a snapshot of the current directory tree of scan target files, and stores the snapshot into second storage means; file scan means that scans, in a distributed manner, the search target files in the respective directories in the snapshot of the current directory tree and a snapshot of a directory tree of search target files acquired prior to the determination of the divided policy and stored in third storage means, the scan being performed with the distributed server cluster on the basis of division units determined by the dividing policy determination means; and comparison means that compares the results of the distributed scans performed by the file scan means, and creates and outputs a list of files that are added, deleted, or changed after the creation of the index information.

Another file list generation device according to the present invention includes: first storage means that stores index information created about search target files; second storage means that copies the current directory tree of the search target files, and stores the copied current directory tree as a backup directory; dividing policy determination means that acquires the directory URLs of the search target files from the index information stored in the first storage means, counts the number of directories in each layer through analysis of the directory URLs, and, based on the result of the counting, determines a dividing policy to divide a scan target directory scanning operation to be performed with a distributed server cluster; means that divides the backup directory of the search target files in accordance with the determined dividing policy; file scan means that scans, in a distributed manner, the search target files in the respective directories in the backup directory of the current directory tree stored in the second storage means and a backup directory tree of search target files acquired prior to the determination of the divided policy and stored in third storage means, the scan being performed with the distributed server cluster on the basis of division units determined by the dividing policy determination means; and comparison means that compares the results of the distributed scans performed by the file scan means, and creates and outputs a list of files that are added, deleted, or changed after the creation of the index information.

The dividing policy determination means determines a dividing policy to set the number of division units as 1 to perform a search target directory scanning operation when the number of directories counted from the highest layer of directories of search target files is smaller than a predetermined number, performs a first scan, with each one division unit being layers from a directory in the highest layer to a predetermined layer when the number of directories counted from the highest layer exceeds the predetermined number, and determines a dividing policy to scan lower layers of scan target directories that are found through the first scan, with each one division unit being the depth of one layer.

A file list generation program according to the present invention is a program used in a file list creation server that creates and outputs a list of files that are added, deleted, or changed after creation of index information. This program causes the file list creation server to function as: dividing policy determination means that acquires the directory URLs of search target files from the index information created about the search target files and stored in first storage means, counts the number of directories in each layer through analysis of the directory URLs, and, based on the result of the counting, determines a dividing policy to divide a scan target directory scanning operation to be performed with a distributed server cluster; means that divides directories of the search target files in accordance with the determined dividing policy, acquires a snapshot of the current directory tree, and stores the snapshot into second storage means; file scan means that scans, in a distributed manner, the search target files in the respective directories in the snapshot of the current directory tree and a snapshot of a directory tree of search target files acquired prior to the determination of the divided policy and stored in third storage means, the scan being performed with the distributed server cluster on the basis of division units determined by the dividing policy determination means; and comparison means that compares the results of the distributed scans performed by the file scan means, and creates and outputs a list of files that are added, deleted, or changed after the creation of the index information.

Another file list generation program according to the present invention is a program used in a file list creation server that creates and outputs a list of files that are added, deleted, or changed after creation of index information. This program causes the file list creation server to function as: means that stores a copy of the current directory tree of search target files as a backup directory into second storage means; dividing policy determination means that acquires the directory URLs of the search target files from the index information created about the search target files and stored in first storage means, counts the number of directories in each layer through analysis of the directory URLs, and, based on the result of the counting, determines a dividing policy to divide a scan target directory scanning operation to be performed with a distributed server cluster; means that divides the backup directory of the search target files in accordance with the determined dividing policy; file scan means that scans, in a distributed manner, the search target files in the respective directories in the backup directory of the current directory tree stored in the second storage means and a backup directory tree of search target files acquired prior to the determination of the divided policy and stored in third storage means, the scan being performed with the distributed server cluster on the basis of division units determined by the dividing policy determination means; and comparison means that compares the results of the distributed scans performed by the file scan means, and creates and outputs a list of files that are added, deleted, or changed after the creation of the index information.

The dividing policy determination means determines a dividing policy to set the number of division units as 1 to perform a search target directory scanning operation when the number of directories counted from the highest layer of the directories of search target files is smaller than a predetermined number, performs a first scan, with each one division unit being layers from a directory in the highest layer to a predetermined layer when the number of directories counted from the highest layer exceeds the predetermined number, and determines a dividing policy to scan lower layers of scan target directories that are found through the first scan, with each one division unit being a depth of one layer.

According to the present invention, the snapshot acquiring function of a storage is utilized, and a snapshot directory acquired at the time of the last indexing and a snapshot directory acquired at the time of current indexing are compared with each other, while a scanning operation is performed with a distributed processing server cluster in a distributed manner. Thus, a list of added, changed, or deleted files is created.

In the above manner, a list of file data added, changed, or deleted in the file server can be created at high speed in the file server in which search indices have already been created once, while the system does not store a large amount of indices file lists storing data including the hash values of search target files. Accordingly, an operation to update the search indices can be performed at high speed, and as a result, the results of searches conducted by the search system can be as accurate as possible.

As a snapshot, a new snapshot may be created mainly for creating a list of added, changed, or deleted file data, or a snapshot created for the purpose of conventional backup may be used. Instead of snapshot directories, backup directories located in parent directories created based on a common naming rule may be created, and the previous and current backup directories may be scanned with a distributed processing server cluster in a distributed manner. It should be noted that, in the following description, a new snapshot mainly for creating a list of added, changed, or deleted file data is created every time an updated index is created, in response to an instruction from the system.

BRIEF DESCRIPTION OF THE DRAWINGS

FIG. 12 shows a URL combination determination table about the snapshot directories acquired last time or this time.

FIG. 13 shows an adding operation determination table for adding a directory or a file indicated by a URL to the list of added, updated, or deleted files, or to the next scan range.

DETAILED DESCRIPTION OF THE PREFERRED EMBODIMENTS

The following is a detailed description of a first embodiment for carrying out the present invention, with reference to the accompanying drawings.

Figure 1:
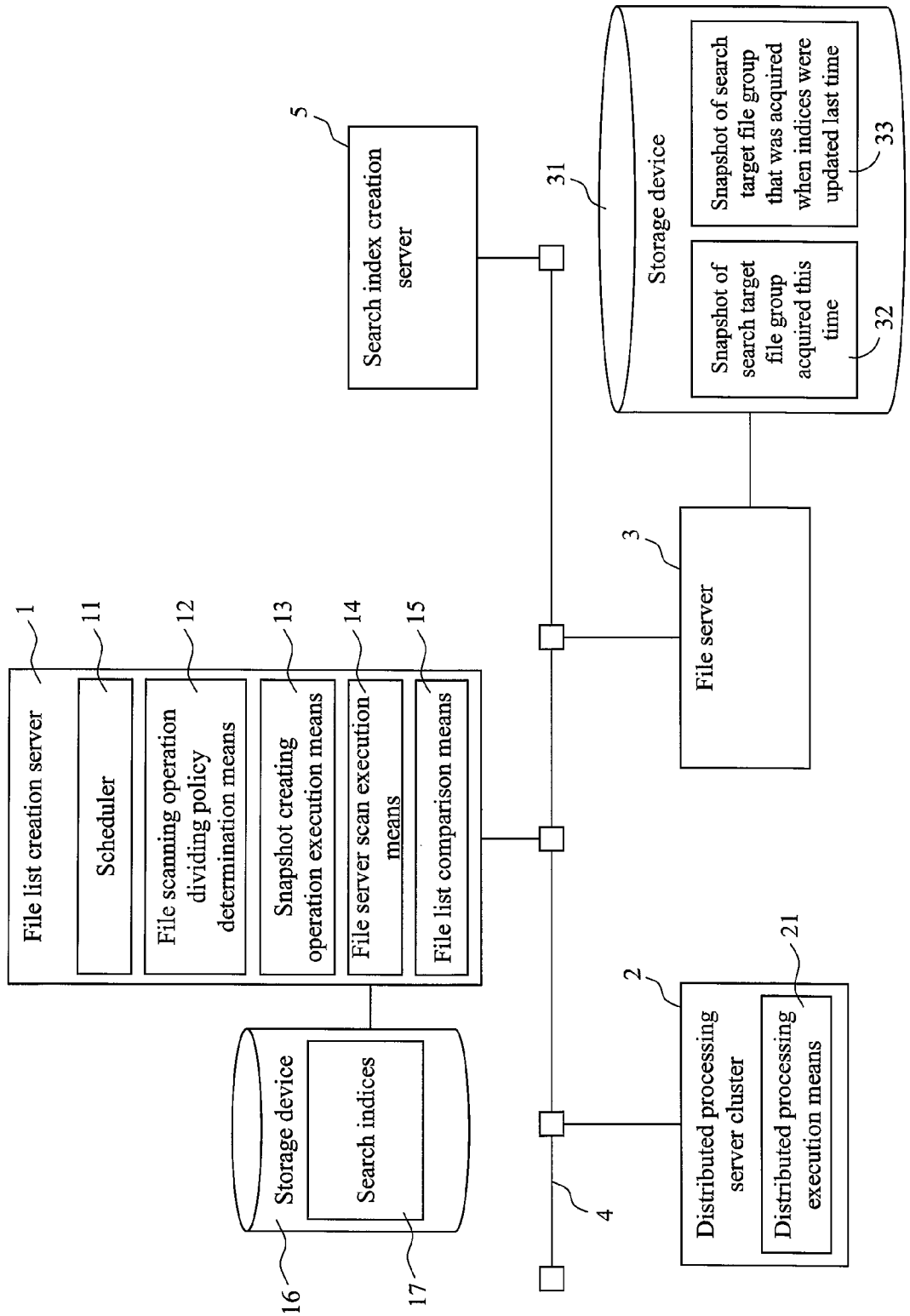
FIG. 1 is a diagram showing a system configuration in a first embodiment according to the present invention.

FIG. 1 is a diagram showing a system configuration in the first embodiment according to the present invention.

The file list generation system shown in FIG. 1 is a system in which a file list creation server 1, a distributed processing server cluster 2, and a file server 3 (hereinafter referred to as the "servers and the like") are connected in such a manner as to be able to communicate with one another by a wire or wireless communication line such as a LAN (Local Area Network) 4 or the like.

In FIG. 1, the servers and the like are connected so as to be able to communicate with one another by the LAN 4. However, the servers and the like are not necessarily connected by a LAN, but may be connected by a WAN (Wide Area Network) or the Internet, for example. Also, in FIG. 1, the servers and the like are connected in the same LAN segment. However, this configuration is merely an example, and the system may have any other configuration. Further, in FIG. 1, the single file list creation server 1, the single distributed processing server cluster 2, and the single file server 3 are provided, but two or more file list creation servers 1, two or more distributed processing server clusters 2, two or more file servers 3 may be provided. The file list creation server 1, the distributed processing server cluster 2, and the file server 3 are not necessarily different devices from one another, and the functions of the file list creation server 1, the distributed processing server cluster 2, and the file server 3 can be realized by a single device, for example.

In the above described configuration, the file list creation server 1 uses the distributed processing server cluster 2 to create a list of file data that have been added, updated, or deleted in the file data in the file server 3 after the last index creation.

The file list creation server 1 is a device such as a PC, and is connected to a storage device 16 so as to be able to communicate with the storage device 16. The storage device 16 is a device such as a magnetic disk, and is installed in or externally connected to the file list creation server 1. The storage device 16 and the main storage device or the like of the file list creation server 1 function as the storage means of the file list creation server 1.

The storage device 16 stores search indices 17. The search indices 17 include one or more pieces of attribute information including the URL of a search target file for which a search index has already been created and is stored in the file server 3. The search indices 17 are updated by a search index creation server 5 connected to the servers and the like so as to be able to communicate with the servers and the like.

The file list creation server 1 includes a scheduler 11, a file scanning operation dividing policy determination means 12, a snapshot creating operation execution means 13, a file scan execution means 14, and a file list comparison means 15.

The file list creation server 1 includes a CPU, a main storage device, and the like. The CPU loads the programs of the file list comparison means 15 and the like stored in the storage device 16 into the main storage device, and executes the instruction codes, to execute various kinds of operations.

Where a list of added, updated, or deleted file data is created on a regular basis, the scheduler 11 refers to a list creating operation execution interval stored in the storage device 16, and actuates the file scanning operation dividing policy determination means 12. After that, the scheduler 11 actuates the snapshot creating operation execution means 13, to create a snapshot in a storage device 31 of the file server 3. The scheduler 11 then actuates the file server scan execution means 14 and the file list comparison means 15, to create a list of added, updated, or deleted file data.

The file scanning operation dividing policy determination means 12 analyzes the search indices 17 stored in the storage device 16, and determines a policy on how to divide a file scanning operation to perform parallel distribution. This operation will be described later as a file scanning operation dividing policy determining operation (S401 and others).

The snapshot creating operation execution means 13 issues a snapshot creating instruction to the file server 3, and creates a snapshot of a search index update target file group in the storage device 31 of the file server 3.

Based on the file data scanning operation dividing policy determined by the file scanning operation dividing policy determination means 12, the file scan execution means 14 acquires a snapshot of a search target file group in the file server 3 at the time of the last index update, and the file data existing in the snapshot directory of the search target file group acquired through the current file scanning operation, and creates lists of the file data existing in the respective snapshot directories.

The file list comparison means 15 compares the list of the file data existing in the snapshot directory of the search target file group that has been created by the file scan execution means 14 and been acquired at the time of the last index update, with the list of files existing in the snapshot directory of the search target file group acquired this time. By doing so, the file list comparison means 15 creates a list of added, updated, or deleted file data.

This operation will be described later as a file server internal data scanning operation (S501 and others).

Figures 2, 3:
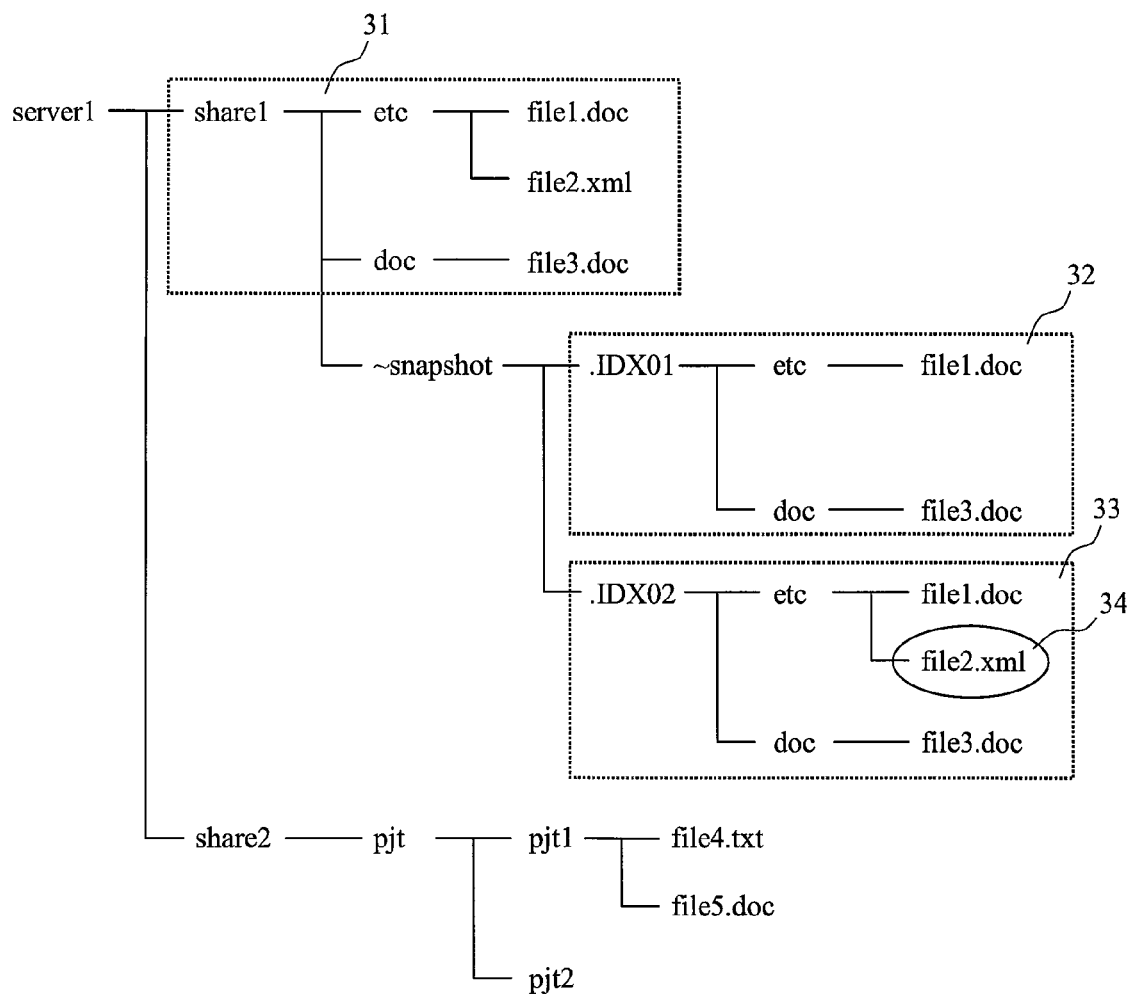
FIG. 2 is a diagram showing an example data structure of an indexed file stored in search indices.
FIG. 3 is a conceptual diagram of a directory structure in the file server.

FIG. 2 is a diagram showing the data structure of a file record 170 as a component of the search indices 17.

The search indices 17 are formed with one or more indexed file records 170. Each one indexed file record 170 stores attribute information (such as the file name, the last access time, the last update time, and the index creation time) about a search target file, including at least the URL 171 of the file.

Specifically, a path for uniquely identifying the file in the file server is set in the file URL 171. For example, the identifier of the file server is "server1", and the URL indicating "file2.xml" in a directory named "etc" immediately below a shared directory of a shared identifier "share1" is http://server1/share1/etc/file2.xml.

FIG. 3 is a conceptual diagram showing a specific example structure of a directory in the file server.

In the directory structure in the file server 3 shown in this conceptual diagram, the identifier of a file server 3 is "server1". The "server1" is shared by two directories that can be uniquely identified by shared identifiers "share1" and "share2", respectively. In "share1" and "share2" in "server1", there are the directories and files shown in the diagram. For example, two directories "etc" and "doc" exist in "share1" of "server1". Two files "file1.doc" and "file2.xml" exist in the directory "etc", and a file "file3.doc" exists in the directory "doc". Likewise, a directory "pjt" exists in "share2" of "server1", and three directories "pjt1", "pjt2", and "pjt3" exist in the directory "pjt". Two files "file4.txt" and "file5.doc" exist in the directory "ptj1".

In "share1", there are also two snapshot directories created by the snapshot creating operation execution means 13 of the file list creation server 1 calling a snapshot creating interface in the file server 3. The two snapshot directories exist under a directory called "~snapshot".

One of the two directories is created under the name of ".IDX01", and the other one is created under the name of ".IDX02". Under each of the snapshot directories, there is a directory and a file group existing under "share1" at the time of the snapshot creation. A file under the snapshot directories created mainly for creating a list of added, updated, or deleted file data may have an original file group in a higher directory, and a search index for such a file does not need to be created. In the following description, there are no search indices created for the files under "~snapshot".

Since file size information accompanies each snapshot, it is possible to determine, from the file size information, whether a change has been made in the file.

Figure 4:
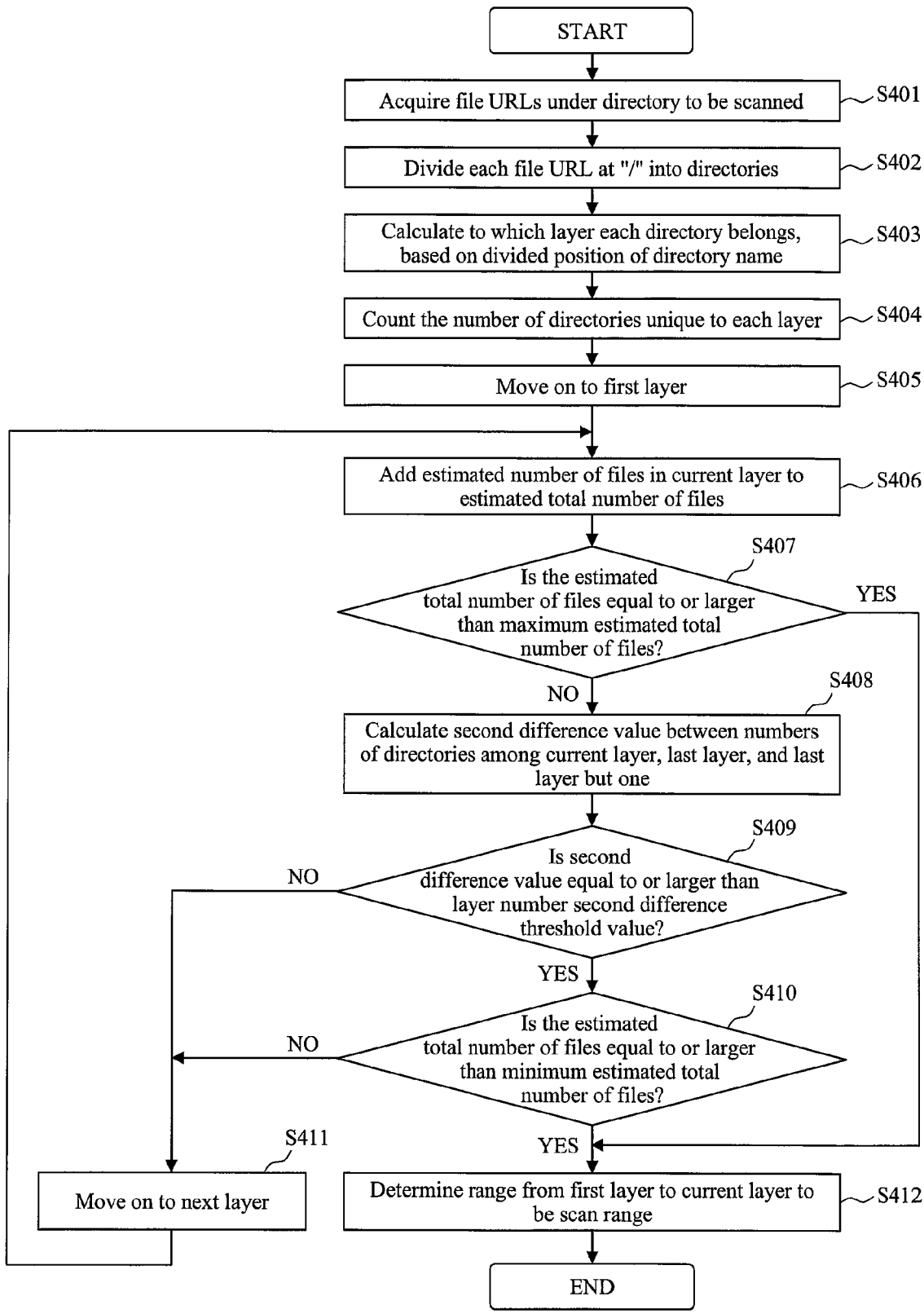
FIG. 4 is a flowchart of an operation to analyze a file tree and determine the policy of dividing a file server scanning operation.

FIG. 4 is a flowchart showing operations of the file scanning operation dividing policy determination means 12.

In view of the fact that the present invention aims to achieve a higher speed by dividing the file tree structure to be scanned and performing scanning operations in parallel, the file scanning operation dividing policy determination means 12 performs a determining operation to appropriately adjust the size of the first scanning operation range by analyzing the directory structure based on an indexed file, so as to prevent the overhead required for performing parallel operations from becoming larger than the benefit of achieving a higher speed by performing the parallel operations in a case where the divided ranges are too small.

Such a determining operation is suitable in a case where the file tree structure to be scanned has a triangular structure in which the number of directories is smaller in a higher layer close to the directory at which a scanning operation is to start, and the number of directories is larger in a lower layer. Particularly among triangular structures, in a case where the rate of increase in the number of directories between layers is not constant but becomes remarkably higher in a middle layer, the range from the highest layer to the layer immediately above the layer at which the rate of increase becomes remarkably higher is set as the first scan range.

Figure 15:
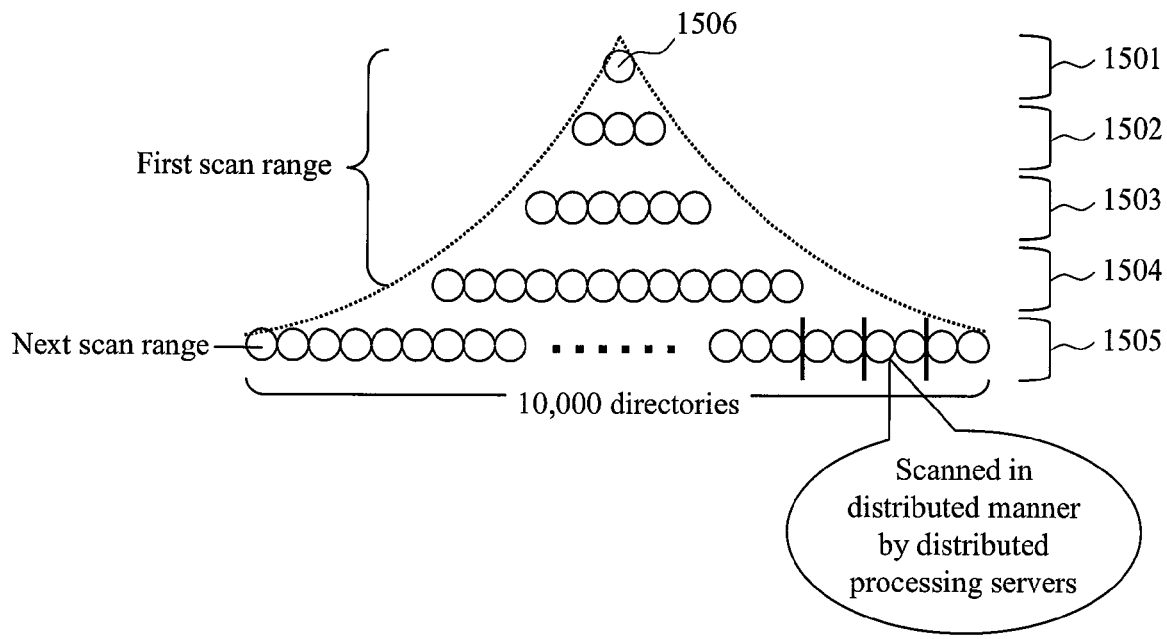
FIG. 15 is a conceptual diagram of a file tree in which the rate of increase becomes remarkably higher in a middle layer of the file tree.

FIG. 15 is a conceptual diagram of a file tree in which the rate of increase becomes remarkably higher in a middle layer. Each circle 1506 in the diagram represents one directory. It should be noted that there are files under each directory. Also, the directories in a lower layer belong to one of the directories in a higher layer.

In the file tree structure of the file server 3 shown in this conceptual diagram, one directory belongs to a first layer 1501, three directories belong to a second layer 1502, six directories belong to a third layer 1503, twelve directories belong to a fourth layer 1504, and 10,000 directories belong to a fifth layer 1505. A file server having such a file tree structure may be an in-house file server constructed in accordance with the hierarchy in a business organization. For example, the first layer 1501 may include a directory for the "head quarter", the second layer 1502 may include directories for "departments", the third layer 1503 may include directories for "divisions", and the fourth layer 1504 may include directories for "individual employees". In such a case, the file tree structure has the above described directory number proportions.

The rate of increase in the number of directories between layers can be approximately calculated with the second difference value between the numbers of directories in the layers.

As in the explanatory diagram shown in FIG. 16, a second difference value is the difference between the number of directories in a lower layer and a first difference value that is the difference between the number of directories in a higher layer and the number of directories in the layer immediately below the higher layer for the number of directories in each layer. The second difference value is equivalent to an approximation of a second derivative operation.

Figure 16:
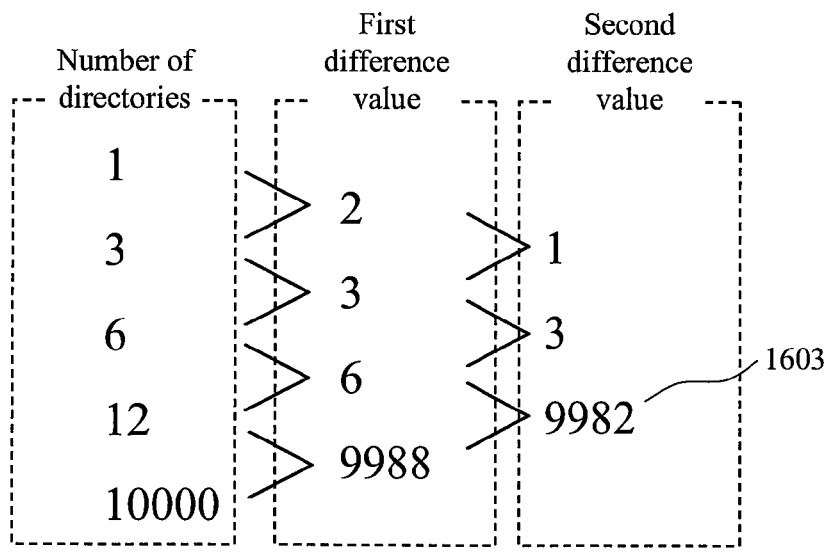
FIG. 16 is a conceptual diagram showing second difference values in the example file tree shown in FIG. 15.

In the explanatory diagram shown in FIG. 16, the second difference value 1603 between the numbers of directories in the fourth layer and the fifth layer shows a sudden change, and accordingly, a sudden change in the number of directories in the fifth layer can be approximately detected.

In the example shown in FIG. 15, the second difference value among the first layer 1501, the second layer 1502, and the third layer 1503 is 1, the second difference value among the second layer 1502, the third layer 1503, and the fourth layer 1504 is 3, and the second difference value among the third layer 1503, the fourth layer 1504, and the fifth layer 1505 is 9,982. Through a comparison among those second difference values, it can be determined that the rate of increase becomes remarkably higher between the fourth layer 1504 and the fifth layer 1505. By using this technique, the file scanning operation dividing policy determination means 12 sets the range from the highest layer 1501 to the fourth layer 1504 as the first scan range having one divisional depth.

The lower layers than the fourth layer set within the first scan range have a large number of directories. Therefore, each one of the lower directory layers is scanned as one depth, and a file list of each of the lower directories is created.

In the fifth layer and the lower layers each having a large number of directories, scanning of the directories belonging to each of those layers is performed by distributed processing servers in a divided manner. In this case, the scanning operation may be divided in any manner.

In a case where the number of directories obtained as a result of counting the directories to the lowest layer is extremely small and is smaller than a predetermined number, dividing a scanning operation does not contribute to an increase in speed, and therefore, the number of divisions is 1 in the scanning operation.

In this embodiment, it is assumed that a snapshot of the directories of the file server reflecting the current directory structure of search target files is stored in a storage device. This is realized by issuing a snapshot acquiring instruction after the determination on the directory dividing policy in the operation shown in FIG. 4 and prior to the start of the operation shown in FIG. 5.

Based on the above aspect, the directory tree reflecting the directory structure of search target files immediately after index creation is first determined from information about the search indices already created for the search target files in this embodiment. The number of directories is counted based on the list of the search target files, and a directory dividing policy for the distributed processing to perform the file scanning with the distributed processing server cluster is determined from the result of the counting. Based on the determined dividing policy, the directories are divided, and a snapshot acquiring instruction is issued to the snapshot creating operation execution means 13 while all the directories are scanned (the first scan, the next scan, the next scan after that, . . . ). As a result, a snapshot of the directory tree reflecting the current file directory structure of files added or deleted is acquired in the storage device 31 of the file server 3. The snapshot of the directory tree acquired prior to the file scan dividing policy determination is compared with the snapshot of the directory tree reflecting the added or deleted files. In this manner, added files and deleted files become apparent from the newly added or deleted files shown in the directory tree. Also, if there is a file to which a directory has not been added but has its contents updated, the file sizes in the snapshot are compared with one another, to determine which file has been updated.

As described above, additions, deletions, and changes of files are detected by comparing snapshots in this embodiment. Accordingly, there is no need to store hash values of search target files as in conventional cases, and a large-capacity storage means is not required either.

The procedures up to S401 in FIG. 4 are as follows. Where a list of added, updated, or deleted file data is created on a regular basis, the scheduler 11 refers to the list creating operation execution interval stored in the storage device 16 as described above, and starts the operation.

First, the records of the URLs 171 of all the files related to a shared directory to be scanned in the file server 3 are acquired from the search indices 17 stored in the storage device 16 (S401).

Each of the acquired file URLs 171 is then divided at each "I" into the directory names in the respective layers in the file path (S402). For example, "http://server1/share1/etc/file2.xml" in the above described example is divided into "http:", " " (an empty column), "server1", "share1", "etc", and "file2.xml". The element at the end is a file name, and is not used in the directory structure analysis. Therefore, the element at the end is discarded. In the above described example, "file2.xml" is not used but is discarded.

A calculation is then performed to determine to which layer each of the divisional directory names belongs in the file path (S403). In the above described example, "share1" of "http://server1/share1/etc/file2.xml" is the first layer, and "etc" is the second layer.

The number of directories in each layer is counted. In the case of the file tree shown in FIG. 3, for example, the number of directories in the first layer related to the shared directory "share1" is calculated to be one, which is "share1".

Likewise, the number of directories in the second layer is calculated to be two, which are "etc" and "doc". Here, search indices have not been created for the directories under "~snapshot", and therefore, "snapshot" is not counted.

In S402 and S403, the distributed processing server cluster 2 uses a distributed processing execution means 21 to perform distributed processing in parallel. For example, directory URLs 171 are distributed to the respective distributed processing servers on the basis of 5,000 rows, and each of the distributed processing servers carries out the procedures of S402 and S403 for each of the assigned directory URLs 171.

The number of directory names unique to each layer is then counted. In this manner, the number of directories in each layer is counted (S404). In S404, the distributed processing server cluster 2 uses the distributed processing execution means 21 to perform distributed processing in parallel. Directory names are distributed to the respective distributed processing servers for each layer calculated in S403, and each of the distributed processing servers carries out the procedure of S404 to count the number of directories unique to the layer assigned thereto.

The operation then moves on to the processing for the first layer among the layers for which the counting has been completed (S405).

An estimated number of files in the first layer is then calculated, and is added to an estimated total number of files (S406). The estimated number of files is calculated by multiplying the number of directories in the first layer calculated in S404 by a certain number. The certain number may be 100, for example. This value is a value stored in a setting file or the like in the file list creation server 1. This value is preferably set by estimating a value close to the average number of files held in one directory.

A check is then made to determine whether the estimated total number of files is equal to or larger than a maximum estimated total number of files (S407).

The maximum estimated total number of files is a value stored in a setting file or the like in the file list creation server 1. This value may be 2,000,000, for example, and is preferably set by estimating the number of files that can be scanned by the single file list creation server 1 within a few hours at the longest in one file scanning operation. In a case where the estimated total number of files is equal to or larger than the maximum estimated total number of files, the range from the first layer to the current layer is collectively determined to be the target range to be scanned (S412).

That is, only the first layer is determined to be the target to be scanned in this case. The maximum estimated total number of files is set so as to prevent a limitless expansion of the target range to be scanned in one operation.

In a case where the estimated total number of files is smaller than the maximum estimated total number of files, the second difference value between the directory numbers among the current layer, the last layer, and the last layer but one is calculated (S408). In the case of the first layer, the last layer and the last layer but one are non-existent. Therefore, the number of directories in the first layer serves as the second difference value.

A check is then made to determine whether the second difference value is equal to or larger than a layer number second difference threshold value (S409). The layer number second difference threshold value may be stored in a setting file or the like in the file list creation server 1. This value approximately indicates how high the rate of increase in the number of directories between layers, and may be 5,000, for example.

In a case where the second difference value is equal to or larger than the second difference threshold value, a check is made to determine whether the estimated total number of files is equal to or larger than a minimum estimated total number of files (S410).

The minimum estimated total number of files is a value stored in a setting file or the like in the file list creation server 1. This value may be 1,000,000, for example, and is preferably set by estimating the number of files to be scanned by the single file list creation server 1 in a few minutes or longer in one file scanning operation.

In a case where the estimated total number of files is equal to or larger than the minimum estimated total number of files, the range from the first layer to the current layer is collectively determined to be the target range to be scanned (S412).

In a case where the estimated total number of files is determined to be smaller than the minimum estimated total number of files in S410, the operation moves on to the next layer (S411).

The operation shown in FIG. 4 is performed to prevent setting of too small a range as a scan range, and therefore, the determining procedure of S410 is included so that a certain number of files are included in each scan range.

In a case where the second difference value is determined to be smaller than the second difference threshold value in S409, the operation moves on to the next layer (S411).

After moving on to the next layer in S411, the operation returns to the procedure of S406. The procedures S406 through S411 are repeatedly carried out until a scan range is determined through the determining procedure in S407, S409, or S410.

Through those procedures, an appropriate range is determined to be the range in which the file scan execution means 14 performs the first scanning operation.

Figure 5:
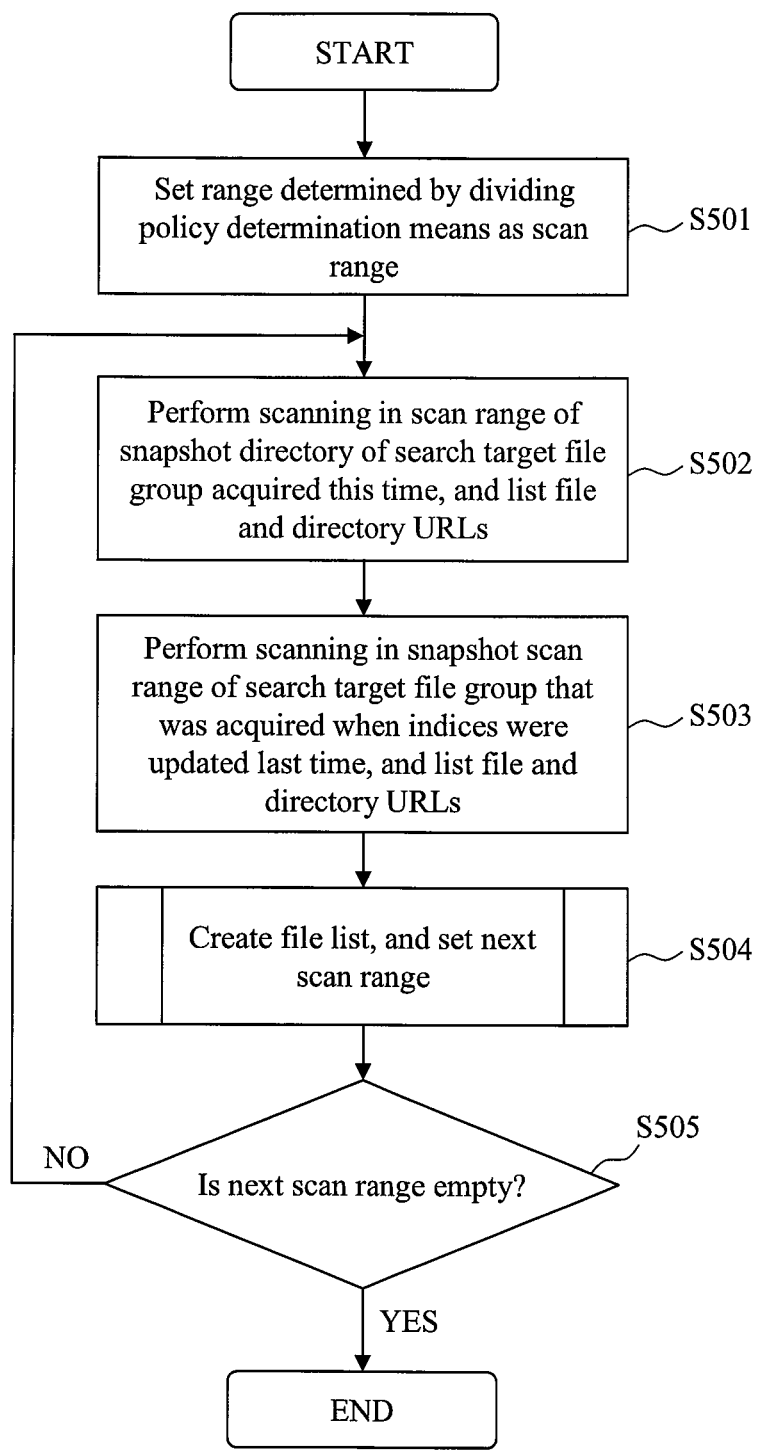
FIG. 5 is a flowchart of an operation to scan the file server.

FIG. 5 is a flowchart showing the operation to be performed by the file server scan execution means 14 and the file list comparison means 15 to create a list of file data that have been added, updated, or deleted.

After the end of the operation shown in the flowchart in FIG. 4, the scheduler 11 uses the snapshot creating operation execution means 13 to create a snapshot of a search target file group in the storage device 31 of the file server 3. After that, the operation shown in FIG. 5 is started. This snapshot is the snapshot used in the above described assumption.

The range determined by the dividing policy determination means shown in the flowchart in FIG. 4 is set as a scan range (S501).

A scan is then performed in the scan range of the snapshot directory of the search target file group acquired in this operation, and file and directory URLs are listed (S502). Since listing files and directories by scanning a partial range in a file server is a known technique, how the file scan execution means 14 performs a scan is not described in detail herein. However, the file list creation server 1 may allow access to a search target file snapshot 32 in the storage device 31 of the file server 3 through a network file system, and may use a local file tree search program of the file list creation server 1 so as to output a list of file paths of respective sets of file data in the file system. Once a file path in the file system is determined, a URL can be created by attaching the identifier of the file server 3 or the like to the file path.

A scan is then performed in the snapshot scan range of the search target files acquired immediately before the start of the operation shown in FIG. 5 or when the indices are updated last time, and file and directory URLs are listed (S503).

A file list is then created, and the next scan range is set (S504). The next scan range is set by determining the directory in the lowermost layer in the range scanned in S502, and setting the layer immediately below the directory as a scan range. That is, after the first scan is performed in S501, the layers in the file tree are scanned one by one. This procedure will be described later as a file list creating and scan range setting operation in detail (S601 and others).

A check is then made to determine whether the next scan range is empty (S505).

If the next scan range is empty, it is determined that the entire file tree has been searched, and therefore, the operation comes to an end.

If the next scan range is not empty, the operation returns to S502 to scan the next scan range and list file and directory URLs.

Figure 6:
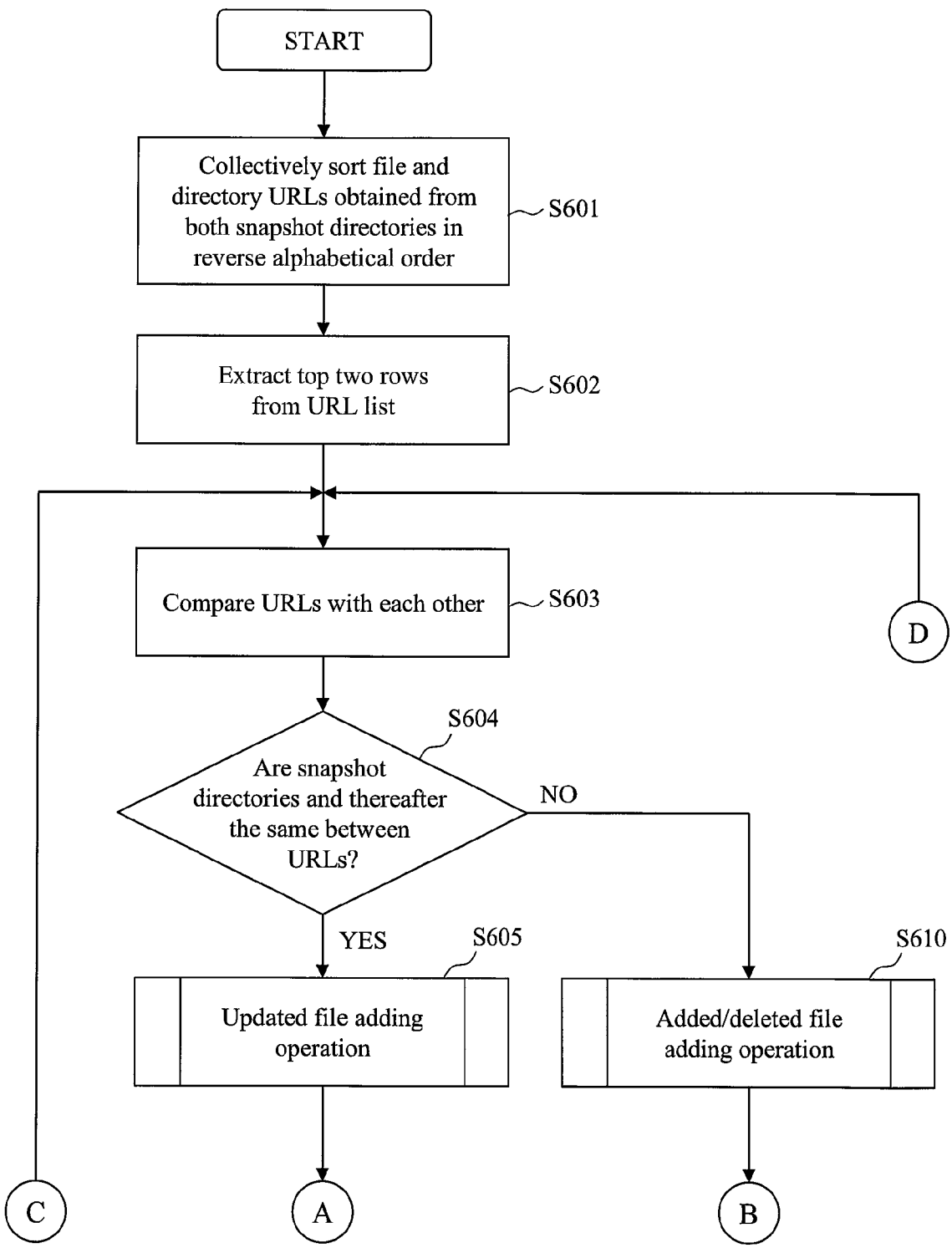
FIG. 6 is a flowchart of an operation to create a list of added, changed, or deleted file data, using a file list obtained by file server scan execution means scanning the data in both of a snapshot directory of a search target file group acquired this time and a snapshot directory of a search target file group acquired at the time of the last index update.

FIG. 6 is a flowchart showing the file list creating and scan range setting operation. This is a specific flow of the procedure of S504 shown in FIG. 5.

First, the file and directory URLs listed in S502 and S503 are collectively sorted in reverse text order (S601). Here, the reverse text order is the alphabetical order reversed (inverted). For example, a character string "abcde" is "edcba" in reverse text order.

The reason why the file and directory URLs listed from the two snapshot directories are sorted in reverse text order in S601 is that, to distribute the creation of a list of added, changed, or deleted file data in the distributed processing server cluster 2, the same file or directory URLs from the two snapshot directories are located adjacent to each other in a file list sorted in reverse text order in a case where the same file or the same directory exists in both snapshot directories.

Figure 17:
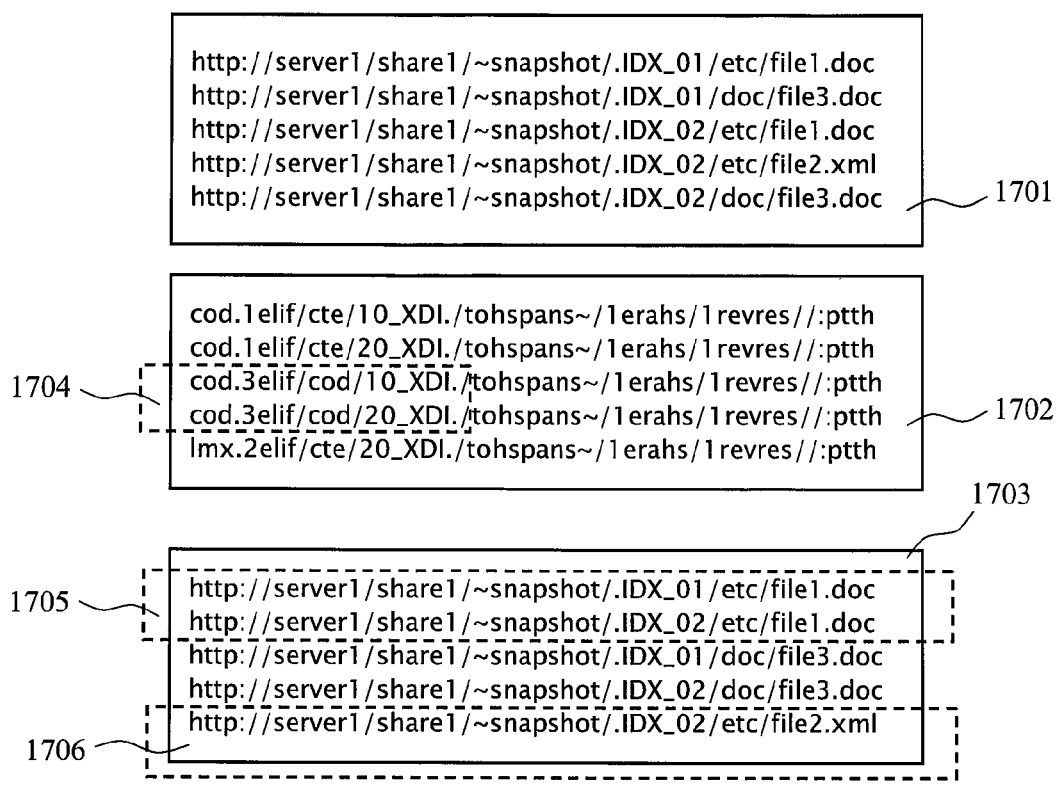
FIG. 17 is a conceptual diagram showing a method of finding an added, updated, or deleted file by sorting in reverse text order.

FIG. 17 shows an example of sorting in reverse text order through the example of file URLs under the snapshot directory 32 and the snapshot directory 33 shown in FIG. 3.

A file list 1701 shows a case where the file URLs in the two snapshot directories are sorted in alphabetical order. A file list 1702 shows a case where the file URLs are sorted in reverse text order. For ease of reference, a file list 1703 is formed by re-reversing the character strings while maintaining the sequence shown in the file list 1702.

As indicated by 1704, by sorting in reverse text order, the URLs of the same file in the two snapshot directories are positioned adjacent to each other. This is because the only difference between the URLs of the same file is the snapshot directory names.

By utilizing this feature, two adjacent rows indicated by 1705 are compared to determine what kind of difference exists between the snapshot directory acquired at the time of the last index update and the snapshot directory acquired this time.

In this manner, a list of added, changed, or deleted file data can be created simply by looking at the two adjacent rows, without paying attention to the entire URL list. Accordingly, the operation to create a list of added, changed, or deleted file data can be distributed in the distributed processing server cluster 2.

The operation to create a list of added, changed, or deleted file data in such a URL list sorted in reverse text order is now described as S602 and the later procedures shown in FIG. 6.

In S602, the top two rows of the URL list are extracted.

The URLs in the top two rows as character strings are compared with each other (S603).

Based on the result of the comparison in S603, a check is made to determine whether the snapshot directories and the directories following the snapshot directories as character strings are the same between the URLs (S604).

If the snapshot directories and thereafter are the same, the file or directory URL under the snapshot directory acquired at the time of the last index update are the same as the file or directory URL under the snapshot directory acquired this time. Accordingly, this file or directory can be determined not to be a file or directory newly added in the file server 3 or a file or directory deleted at the time of the last indexing, but can be determined to be a file or directory that has not been changed or has been updated. This file or directory is added as a file or directory that might have been updated, to the list of added, updated, or deleted file data (S605). This procedure will be described later as an updated file adding operation in detail (S901 and others).

Figure 7:
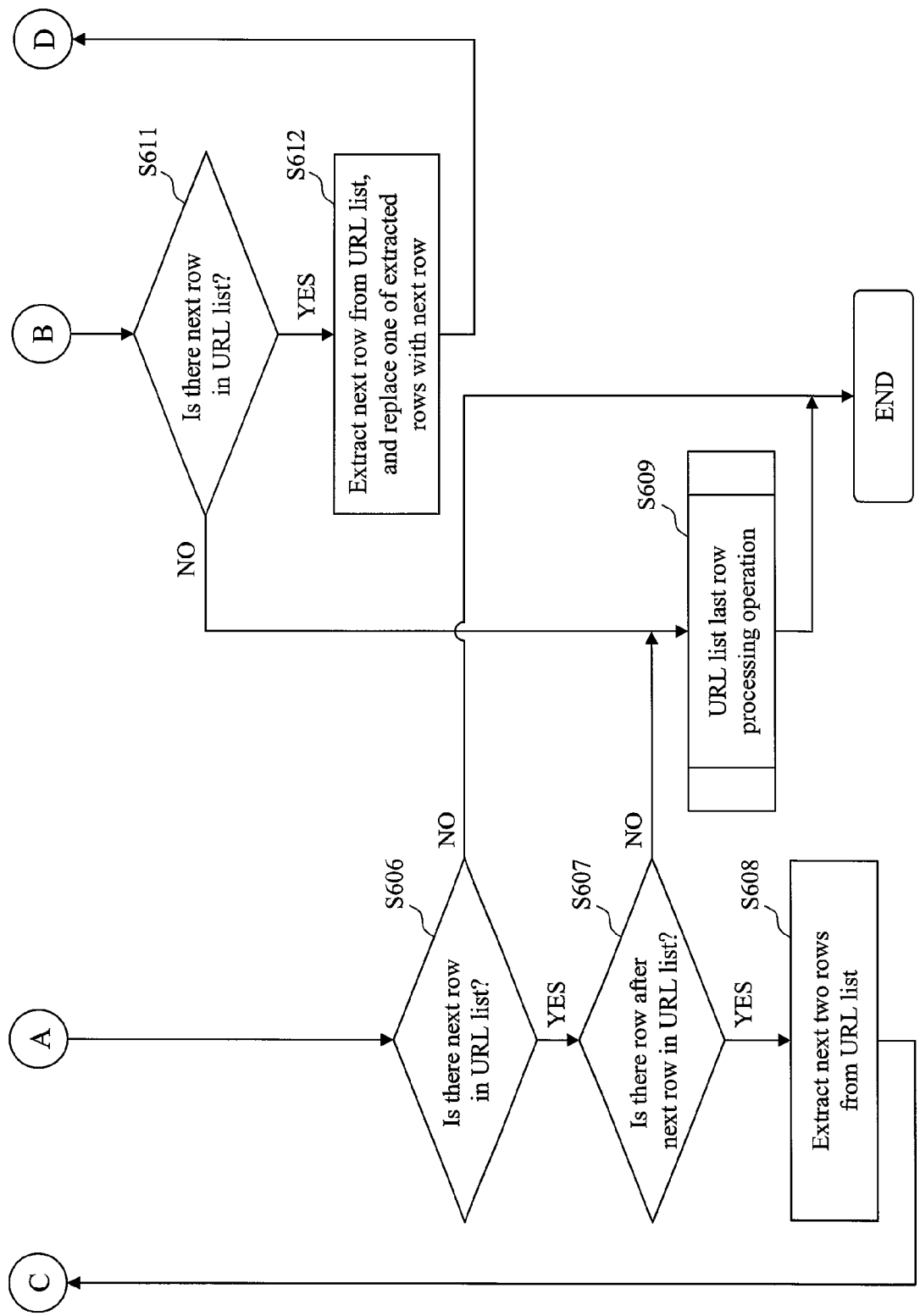
FIG. 7 is a flowchart showing the operation continuing from FIG. 6.

A check is then made to determine whether there is the next row in the URL list (S606 shown in FIG. 7).

If there is the next row in the URL list, a check is made to determine whether there is a row after the next row in the URL list (S607).

If there is a row after the next row in the URL list, or if there are the next two rows in the URL list, the next two rows are extracted (S608).

The operation then returns to S603 shown in FIG. 6, and the next URLs are compared with each other. Those procedures are repeatedly carried out until those procedures have been carried out on all the URLs in the URL list.

In a case where it is determined in S606 that the next row does not exist in the URL list, it is determined that the procedures have been carried out on all the URLs in the URL list, and the operation comes to an end.

In a case where it is determined in S607 that a row after the next row does not exist in the URL list, or in a case where there is only one row left in the URL list, the operation to add the last row to the list of added, updated, or deleted files is performed (S609). This procedure will be described later as a URL list last row processing operation in detail (S701 and others).

In a case where it is determined in S604 that the snapshot directories and thereafter as character strings are not the same in the URL list, it can be determined that a file or directory has been added in the file server 3, or a file or directory indexed last time has been deleted. Therefore, a check is made to determine whether a file has been added or whether a file has been newly deleted, and an operation to add the file to the list of added, updated, or deleted files (S610). This procedure will be described later as an added/deleted file adding operation in detail (S801 and others).

A check is then made to determine whether there is the next row in the URL list (S611).

In a case where the next row exists in the URL list, the first row between the currently extracted rows is discarded as a determined row, the second row between the currently extracted rows shifts to the first row, and the next row is extracted and is set as the second row (S612).

In a case where the next row does not exist in the URL list, the currently extracted second row is set as the last row, and the URL last row processing operation (S609) is performed.

By comparing the URLs in a URL list from the top to the bottom in the above described manner, all the added, updated, or deleted files in the corresponding range can be added to the list of added, updated, or deleted file data.

Through those procedures, a list of added, updated, or deleted file data in the current scan range is created, and the next scan range is determined.

Figure 8:
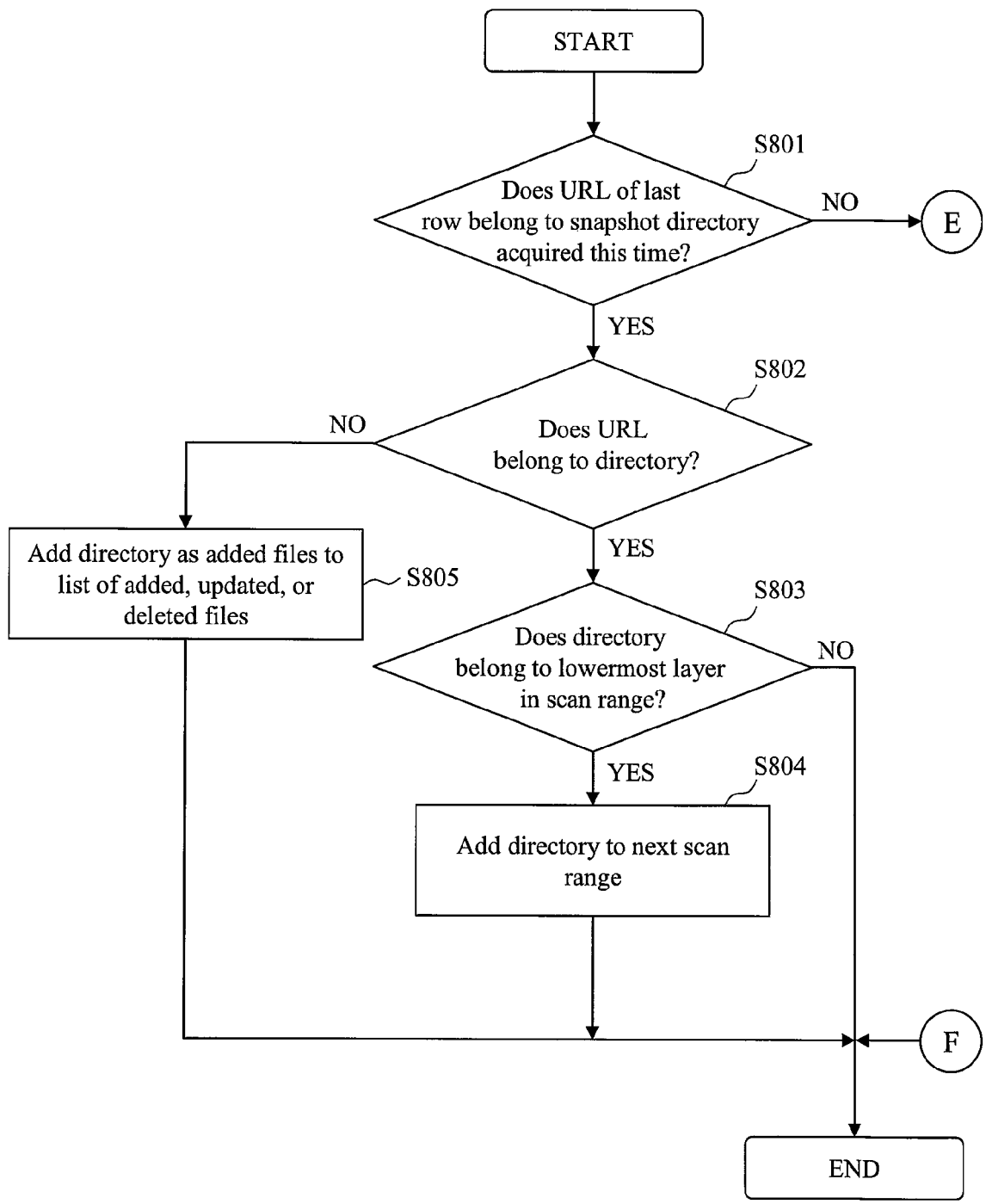
FIG. 8 is a flowchart of a URL list last row processing operation.
Figure 9:
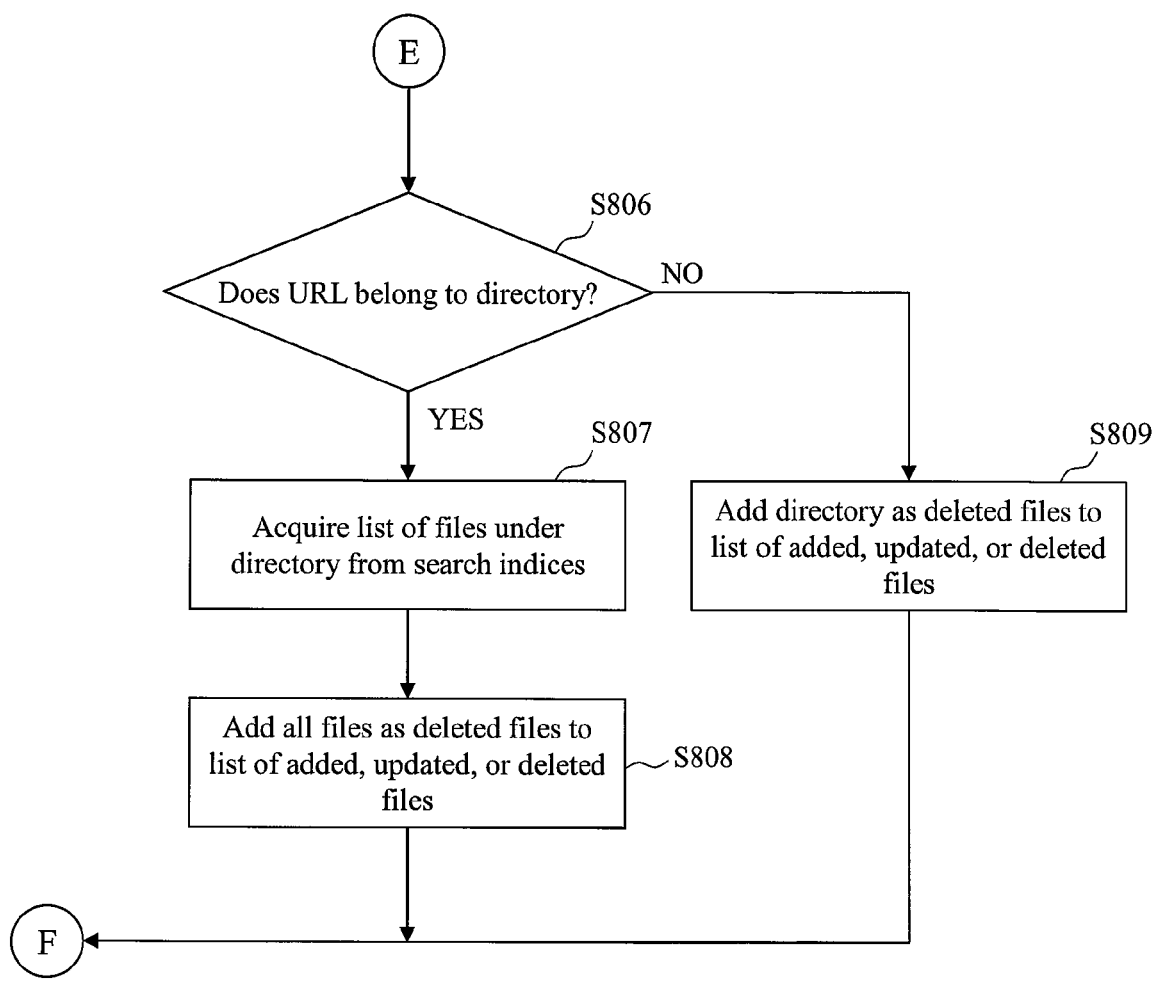
FIG. 9 is a flowchart showing the operation continuing form FIG. 8.

FIGS. 8 and 9 are flowcharts showing the URL list last row processing operation. This flowchart shows the specific processing flow in S609 shown in FIG. 6.

First, a check is made to determine whether the URL in the last row is of the snapshot directory acquired this time (S801).

In a case where the URL in the last row is of the snapshot directory acquired this time, a check is further made to determine whether the URL is of a directory (S802).

In a case where the URL is of a directory, a check is made to determine whether the directory belongs to the lowermost layer in the scan range (S803). In FIG. 15, for example, in a case where the first through fifth layers 1501 through 1505 in the file tree are set as the scan range, the URL of a directory belonging to the fifth layer 1505 is determined to be of a directory in the lowermost layer.

In a case where the directory indicated by the URL is of a directory in the lowermost layer, the directory is one of the origin directories in the next scan range, and accordingly, is added to the next scan range (S804). This next scan range may be stored in the main storage device of the file list creation server 1, or, if the number of directories to be added to the next scan range is large, the next scan range may be temporarily stored in the storage device 15 and be loaded in the next operation.

In a case where it is determined in S803 that the URL is not of a directory in the lowermost layer in the scan range, the directory does not need to be added to the next scan range, and therefore, the operation shown in FIG. 8 comes to an end.

In a case where it is determined in S802 that the URL is not of a directory but of a file, the file can be determined to be a file that did not exist at the time of the last index update but does exist at the time of the current indexing, or a file that has been added to the file server 3. Accordingly, the file is added as an added file to the list of added, updated, or deleted files (S805).

In a case where it is determined in S801 that the URL in the last row is not of the snapshot directory acquired this time but of the snapshot directory acquired at the time of the last index update, a check is made to determine whether the URL is of a directory (S806).

In a case where the URL is of a directory, the directory can be determined to be a directory that existed at the time of the last index update but does not exist at the time of the current indexing, or a directory that has been deleted from the file server 3. In this case, all the files under the directory that have been indexed in the search indices need to be deleted. Therefore, a list of files under the directory is acquired from the search indices (S807).

All the files in the list acquired in S807 are then added as deleted files to the list of added, updated, or deleted files (S808).

In a case where it is determined in S806 that the URL is not of a directory but of a file, the file can be determined to be a file that existed at the time of the last index update but does not exist at the time of the current indexing, or a file that has been deleted from the file server 3. Therefore, the file is added as a deleted file to the list of added, updated, or deleted files (S809).

Through those procedures, the URL in the last row in the URL list is added to the list of added, updated, or deleted files, or to the next scan range.

Figure 10:
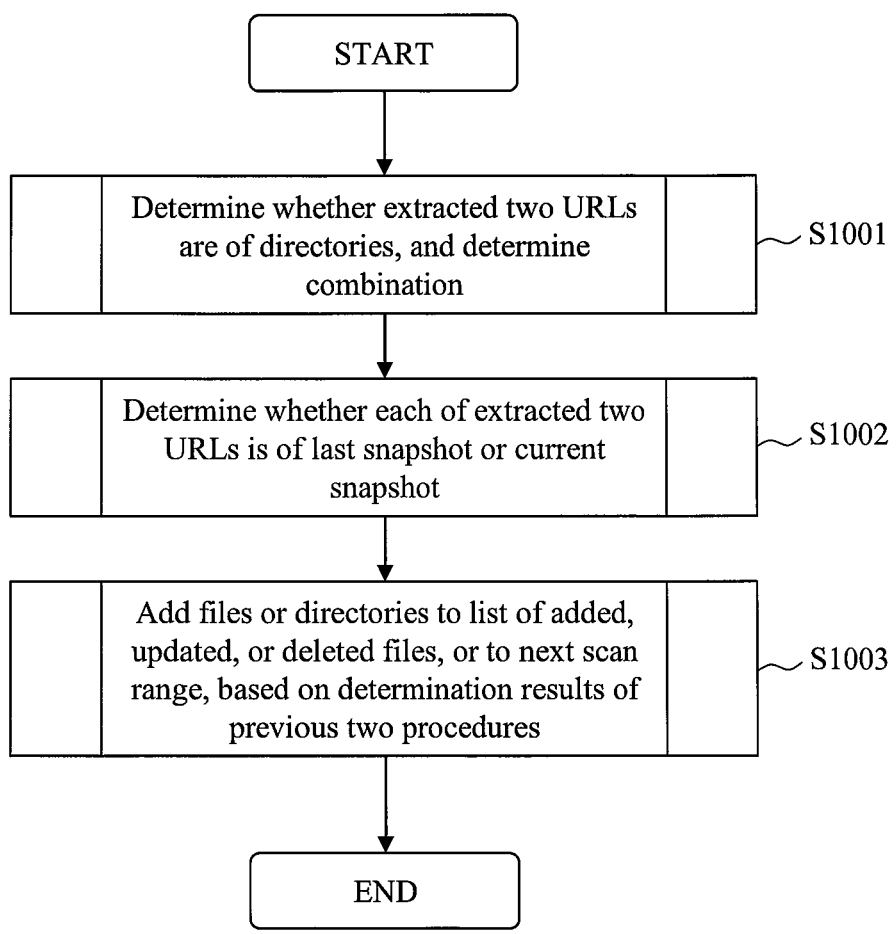
FIG. 10 is a flowchart of an operation to make an addition to the list of added, changed, or deleted file data, by determining whether data has been added or deleted in the file server, from the result of comparison between file or directory URLs extracted from a URL list.

FIG. 10 is a flowchart showing the operation to add the added/deleted file(s) to the list of added, updated, or deleted files, or to the next scan range.

A check is made to determine whether the two URLs first extracted are of directories or of files, and a check is further made to determine whether the URL in the first row is of a file while the URL in the second row is of a file, whether the URL in the first row is of a file while the URL in the second row is of a directory, whether the URL in the first row is of a directory while the URL in the second row is of a file, or whether the URL in the first row is of s directory while the URL in the second row is of a directory (S1001). This procedure will be described later as a directory- or file-related URL combination determining operation in detail (S1001 and others).

A check is then made to determine whether each of the URLs in the first and second rows of the two URLs next extracted are of the snapshot directory acquired at the time of the last index update or of the snapshot directory acquired this time, and the combination is determined (S1002). This combination will be described later as a URL combination determination table about the snapshot directories acquired last time and this time in detail (1201 and others).

Based on the determination results of S1001 and S1002, the directories or files indicated by the extracted URLs are added to the list of added, updated, or deleted files, or to the next scan range (S1003). This determination will be described later as an adding operation determination table for adding directories or files indicted by URLs to the list of added, updated, or deleted files, or to the next scan range in detail (1301 and the others).

Figure 11:
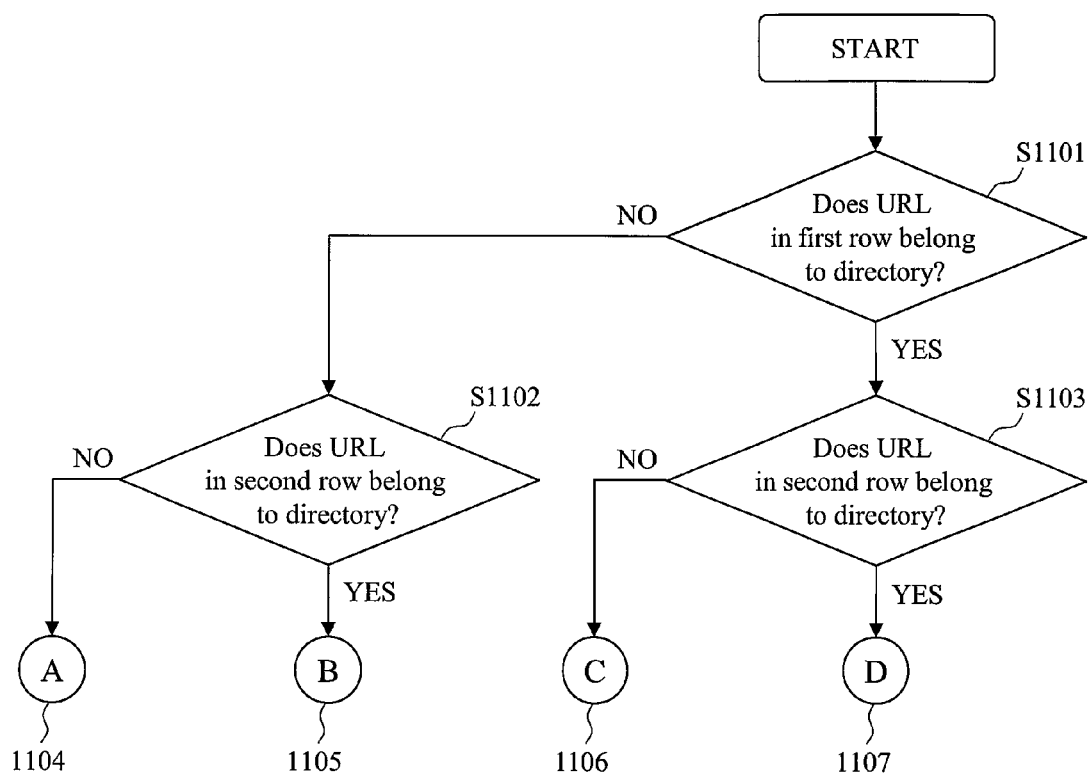
FIG. 11 is a flowchart of an operation to determine a URL combination of directories or files.

FIG. 11 is a flowchart showing the operation to determine whether each of the extracted two URLs is a directory URL or a file URL, and determine a combination.

First, a check is made to determine whether the URL in the first row is of a directory (S1101).

In a case where it is determined in S1101 that the URL in the first row is not of a directory but of a file, a check is made to determine whether the URL in the second row is of a directory (S1102).

In a case where it is determined in S1102 that the URL in the second row is not of a directory but of a file, the URLs in those two rows are determined to be a combination of two files. For ease of explanation of the determining procedure of S1003 shown in FIG. 10, this combination is named A (1104).

In a case where it is determined in S1102 that the URL in the second row is of a directory, the URLs of those two rows are determined to be a combination of a file and a directory. This combination is named B (1105), for convenience sake.

In a case where it is determined in S1101 that the URL in the first row is of a directory, a check is made to determine whether the URL in the second row is of a directory (S1103).

In a case where it is determined in S1103 that the URL in the second row is not of a directory but of a file, the URLs in those two rows are determined to be a combination of a directory and a file. This combination is named C (1106), for convenience sake.

In a case where it is determined in S1103 that the URL in the second row is of a directory, the URLs in those two rows are determined to be a combination of two directories. This combination is named D (1107), for convenience sake.

In S1003 shown in FIG. 10, a check is made to determine whether the extracted two URLs are under the snapshot directory acquired at the time of the last index update or whether the extracted two URLs are under the snapshot directory acquired this time. This determination can be readily performed by a known technique, and therefore, is not described in detail. However, a check may be made to determine whether a character string includes a character string indicating the snapshot directory acquired at the time of the last index update.

Figure 12:
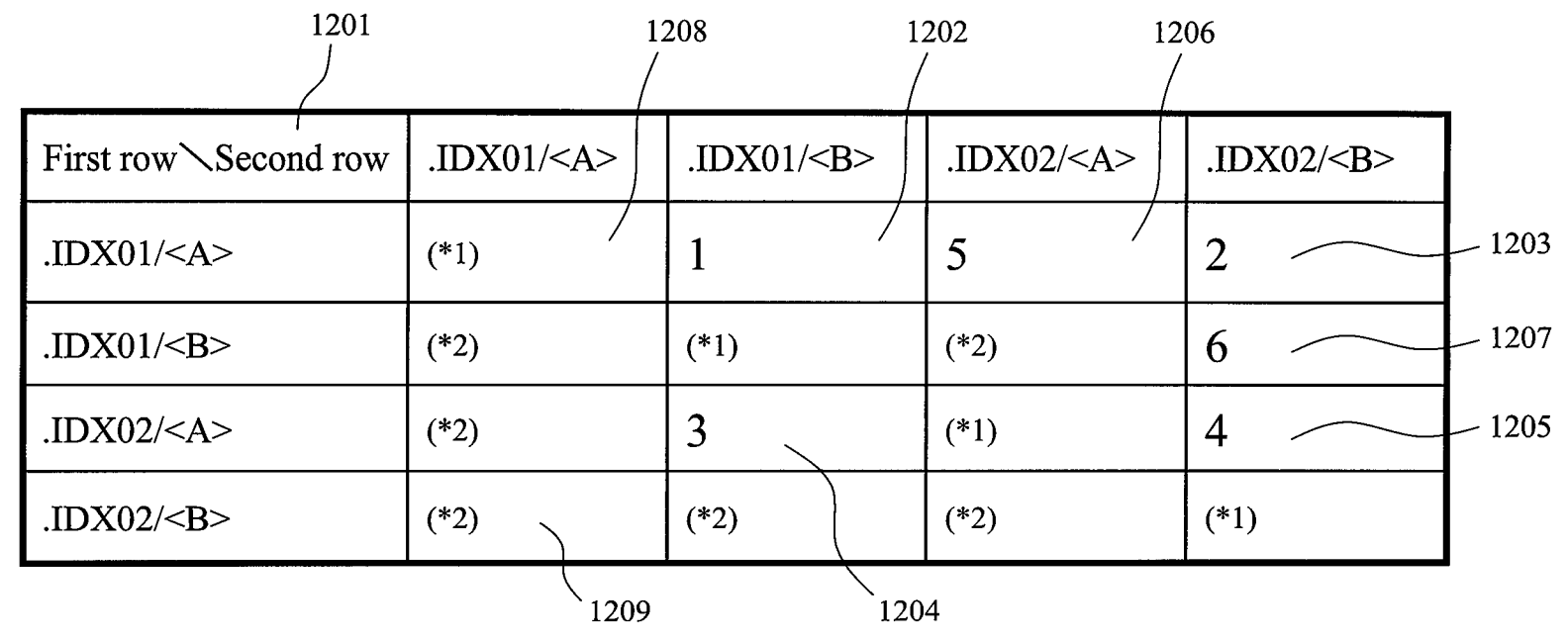

FIG. 12 shows the results of determination performed on each of the two URLs in the form of a table 1201.

Here, the first half of each of the URLs, "http://server1/share1/", is not shown, for ease of reference. It should be noted that <A> and <B> are used as symbols representing appropriate file paths under the snapshot directories. For example, ".IDX01/<A>" in the table indicates the file URL, "http://server1/share1LIDX01/etc/file1.doc".

In the table 1201, a combination having "(*1)" attached thereto as indicated by 1208 represents a situation where identical URLs appear in two successive rows, and such a situation is never developed in a case where a URL list has been created by the above described method.

Likewise, a combination having "(*2)" attached thereto as indicated by 1209 does not appear, since the reverse text order sorting operation of S601 shown in FIG. 6 has been performed.

The URL combinations that can appear are the six types indicated by 1202 through 1207. Those combinations are named 1 through 6, for ease of explanation.

Of the combinations 1 through 6, the combinations 5 (1206) and 6 (1207) are cases where the extracted two rows are identical URLs, and the operation moves on to S605 based on the determination result of S604 shown in FIG. 6. Accordingly, those are the cases that can be ignored in FIGS. 12 and 13, as mentioned in the description of the procedure of S610.

In S1003 shown in FIG. 10, the URLs extracted based on the results of determinations of S1001 and S1002 are added to the list of added, updated, or deleted files, or to the next scan range. FIG. 13 shows a table 1301 that shows how each extracted URL is to be handled, based on combinations of the determination results A through D of S1001 and the determination results 1 through 4 of S1002.

In a case where the determination result of S1001 is A (1104), and the determination result of S1002 is 1 (1202), for example, the file indicated by the URL in the extracted first row is added to the list of added, updated, or deleted files (1302).

In S1003, only the first rows of all the extracted URLs are added to the list of added, updated, or deleted files, or to the next scan range. In cases where the determination result of S1002 is 2 or 4 as indicated by 1303 and 1304 in the table 1301, when the next row exists, the result of the determination performed on those two rows is invariably the same as the determination result 3 or 4 of S1002. The result of those procedures is the same as the result of the procedures carried out in accordance with the flowchart shown in FIG. 8, in which the next row is the last row. Therefore, in the cases of 1303 and 1304, how to handle the directory or file indicated by the URL in the second row can be determined at this point. In this embodiment that continues to be described below, only the URL in the first row is processed, and the URL in the second row is processed in the operation after the repeated procedures shown in FIG. 6.

Figure 14:
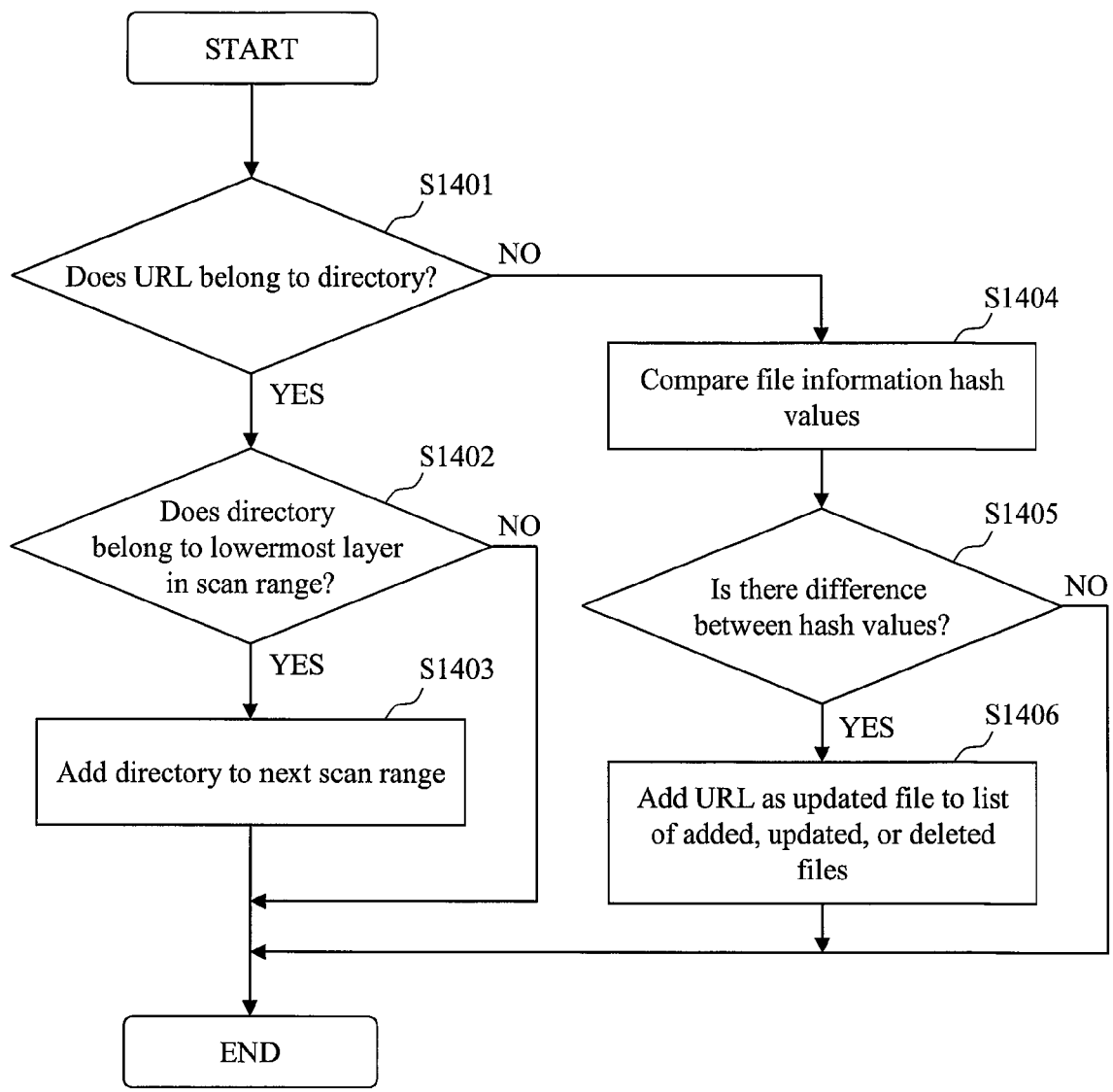
FIG. 14 is a flowchart of an updated file adding operation.

FIG. 14 is a flowchart showing the updated file adding operation. This is a specific processing flow of S605 shown in FIG. 6.

First, a check is made to determine whether the URL is of a directory (S1401). Since the URLs under the snapshot directories are the same, the URL used in this determination may be the URL in the first row or the URL in the second row.

In a case where the URL is of a directory, a check is made to determine whether the directory is a directory belonging to the lowermost layer in the scan range (S1402). The scan range is determined by using the URLs related to the snapshot directory acquired this time.

In a case where the directory indicated by the URL is a directory belonging to the lowermost layer in the scan range, the directory is one of the origin directories in the next scan range, and therefore, is added to the next scan range (S1403).

In a case where it is determined in S1402 that the directory is not a directory belonging to the lowermost layer in the scan range, there is a lower directory included in the current scan range, and therefore, the directory does not need to be added to the next scan range. Also, there is no need to create a search index for the directory, and nothing needs to be added to the list of added, updated, or deleted files. Accordingly, the operation comes to an end.

In a case where it is determined in S1401 that the URL is not of a directory but of a file, file information hash values of the files indicated by the URLs in the extracted two rows are calculated from meta data about file update time, sizes, and the like, and the two hash values are compared with each other (S1404).

A check is then made to determine whether there is a difference between the compared hash values (S1405).

In a case where it is determined in S1405 that there is a difference between the hash values, the difference indicates that the file has been updated, and therefore, the URL is added as an updated file to the list of added, updated, and deleted files (S1406).

In a case where it is determined in S1405 that the hash values are the same, the file has not been updated, and the file does not need to be added to the list of added, updated, or deleted files. Accordingly, the operation comes to an end.

Through those procedures, in a case where an URL indicates a file that has been updated, the URL is added as an updated file to the list of added, updated, or deleted files. In a case where a URL is of a directory belonging to the lowermost layer in the scan range, the URL is added to the next scan range.

Figure 18:
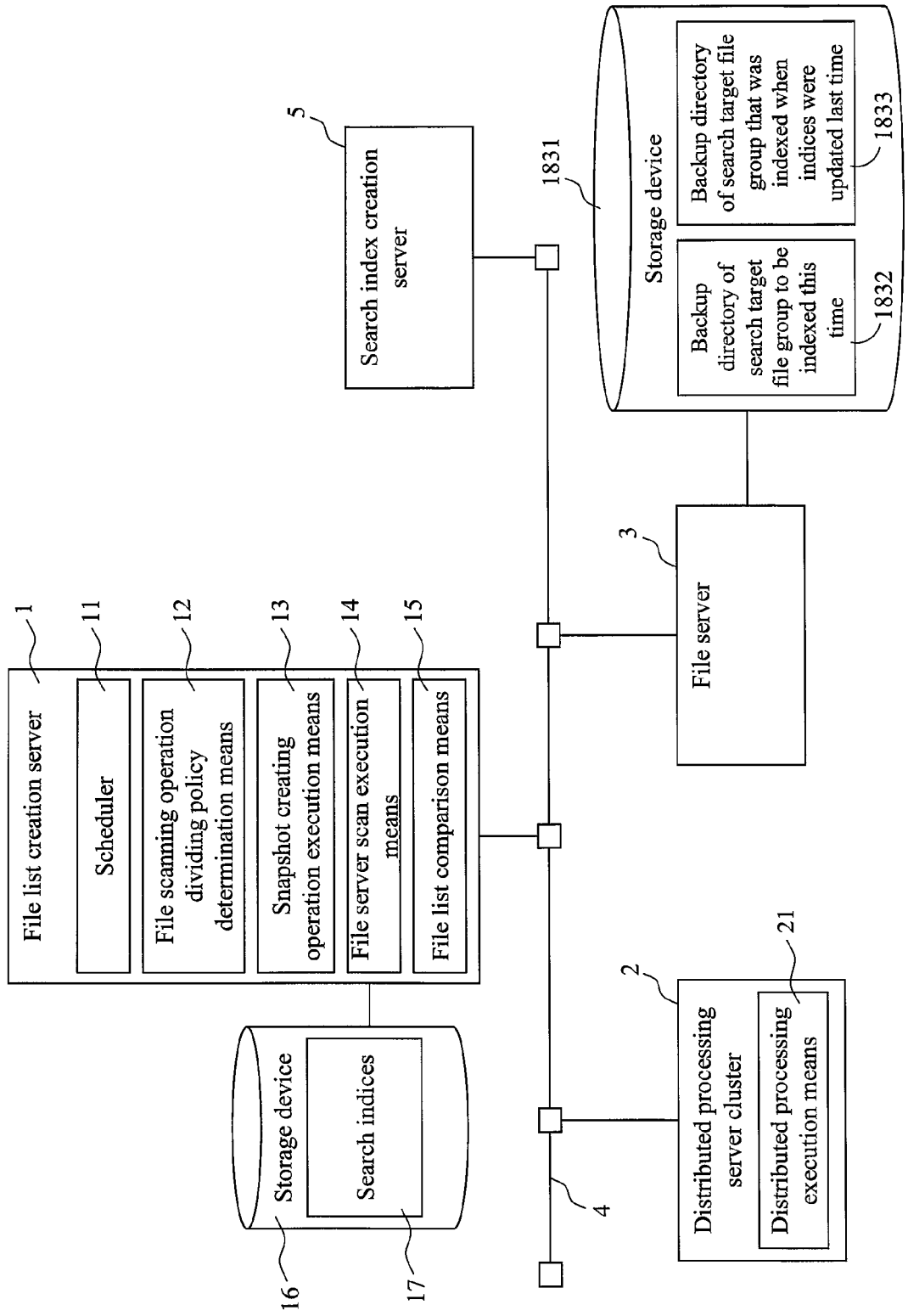
FIG. 18 is a diagram showing a system configuration in another embodiment of the present invention.

FIG. 18 is a diagram showing a system configuration in another embodiment of the present invention. This embodiment is to generate a list of added, updated, or deleted file data by using a snapshot that has been created for the purpose of conventional backup.

That is, a snapshot is a function to "acquire a backup" of target files. This function is executed by a storage manager conducting a "simple operation" (one click of a button) with a "small capacity" at "high speed". A backup directory acquired by the storage manager manually copying and pasting target files is substantially the same as a snapshot directory.

In this embodiment, two backup directories are stored in a storage device 1831 of a file server 3. Specifically, a backup directory 1832 of a search target file group to be indexed in the current operation and a backup directory 1833 of a search target file group indexed at the time of the last index update are stored in the storage device 1831, and are used in place of the snapshot 32 of a search target file group acquired this time and the snapshot 33 of a search target file group acquired at the time of the last index update, which are shown in FIG. 1. Those two backup directories are used to generate a list of file data that have been newly added, updated, or deleted since the last index update (creation).

A file list creation server 1, a file scanning operation dividing policy determination means 12, a snapshot creating operation execution means 13, a file scan execution means 14, a file list comparison means 15, and a distributed processing server cluster 2 are used in the same manner as in the embodiment illustrated in FIG. 1, to create a list of file data that have been newly added, updated, or deleted since the last index update (creation).

Therefore, detailed explanation of them is not provided herein.

It should be noted that this embodiment differs from the foregoing embodiment in that the snapshot creating operation execution means is replaced with a storage manager who manually copies and pastes the current directory tree of search target files, and stores the backup directories into a storage means.

DESCRIPTION OF SYMBOLS

1 File list creation server
2 Distributed processing server cluster
3 File server
4 Network
11 Scheduler
12 File scanning operation dividing policy determination means
13 Snapshot creating operation execution means
14 File scan execution means
15 File list comparison means
16 Storage device connected to the file list creation server 1
17 Search indices
21 Distributed processing execution means
31 Storage device connected to the file server 3
32 Snapshot of the search target file group acquired this time
33 Snapshot of the search target file group acquired at the time of the last index update
170 File record in the search indices 17
171 File URL

What is claimed is:

1. A file list generation method, comprising the steps of:
storing index information created about search target files into a first storage area;
determining a dividing policy to divide a scan target directory scanning operation to be performed with a distributed server cluster, by acquiring directory URLs of the search target files from the index information stored in the first storage area, and counting the number of directories in each layer through analysis of the directory URLs, the scan target directory scanning operation being divided based on the result of the counting;
dividing directories of the search target files in accordance with the determined dividing policy;
acquiring a snapshot of a current directory tree of scan target files, and storing the snapshot into a second storage area;
scanning, in a distributed manner, the search target files in respective directories in the snapshot of the current directory tree and a snapshot of a directory tree of search target files acquired prior to the determination of the divided policy and stored in a third storage area, the scanning being performed with the distributed server cluster on the basis of division units determined in the determining the dividing policy; and
comparing the results of the distributed scans, and creating and outputting a list of files that are added, deleted, or changed after the creation of the index information.

2. A file list generation method, comprising the steps of:
storing index information created about search target files into a first storage area;
copying a current directory tree of the search target files, and storing the copied current directory tree as a backup directory into a second storage area;
determining a dividing policy to divide a scan target directory scanning operation to be performed with a distributed server cluster, by acquiring directory URLs of the search target files from the index information stored in the first storage area, and counting the number of directories in each layer through analysis of the directory URLs, the scan target directory scanning operation being divided based on the result of the counting;
dividing the backup directory of the search target files in accordance with the determined dividing policy;
scanning, in a distributed manner, the search target files in respective directories in the backup directory of the current directory tree and a backup directory tree of search target files acquired prior to the determination of the divided policy and stored in a third storage area, the scanning being performed with the distributed server cluster on the basis of division units determined in the determining the dividing policy; and
comparing the results of the distributed scans, and creating and outputting a list of files that are added, deleted, or changed after the creation of the index information.

3. The file list generation method according to claim 1, wherein the step of determining the dividing policy includes the steps of
determining a dividing policy of setting the number of division units as one to perform a search target directory scanning operation when the number of directories counted from the highest layer of directories of search target files is smaller than a predetermined number,
performing a first scan, with each one division unit being layers from a directory in the highest layer to a predetermined layer when the number of directories counted from the highest layer exceeds the predetermined number, and determining a dividing policy to scan lower layers of scan target directories that are found through the first scan, with each one division unit being a depth of one layer.

4. The file list generation method according to claim 2, wherein the step of determining the dividing policy includes the steps of determining a dividing policy of setting the number of division units as one to perform a search target directory scanning operation when the number of directories counted from the highest layer of directories of search target files is smaller than a predetermined number, performing a first scan, with each one division unit being layers from a directory in the highest layer to a predetermined layer when the number of directories counted from the highest layer exceeds the predetermined number, and determining a dividing policy to scan lower layers of scan target directories that are found through the first scan, with each one division unit being a depth of one layer.

5. A file list generation system comprising:

a processor; and a first storage area, connected to said processor, that stores index information created about search target files and instructions that, when executed by the processor, instruct the processor to perform acts including:

acquiring directory URLs of the search target files from the index information stored in the first storage area, counting the number of directories in each layer through analysis of the directory URLs, and, based on the counting, determining a dividing policy to divide a scan target directory scanning operation to be performed with a distributed server cluster;

dividing directories of the search target files in accordance with the dividing policy, acquires a snapshot of a current directory tree of scan target files, and storing the snapshot into a second storage area;

scanning, in a distributed manner, the search target files in respective directories in the snapshot of the current directory tree and a snapshot of a directory tree of search target files acquired prior to the determination of the divided policy and stored in a third storage area, the scanning being performed with the distributed server cluster on the basis of division units determined by the dividing policy; and comparing the results of the distributed scans performed by the scanning, and creating and outputting a list of files that are added, deleted, or changed after the creation of the index information.

6. A file list generation system comprising:

a processor;

a first storage area, connected to said processor, that stores index information created about search target files; and a second storage area, connected to said processor, that copies a current directory tree of the search target files, and stores the copied current directory tree as a backup directory, wherein the first storage area stores instructions that, when executed by the processor, instruct the processor to perform acts including:

acquiring directory URLs of the search target files from the index information stored in the first storage area, counting the number of directories in each layer through analysis of the directory URLs, and, based on the counting, determining a dividing policy to divide a scan target directory scanning operation to be performed with a distributed server cluster;

dividing the backup directory of the search target files in accordance with the determined dividing policy;

scanning, in a distributed manner, the search target files in respective directories in the backup directory of the current directory tree stored in the second storage area and a backup directory tree of search target files acquired prior to the determination of the divided policy and stored in a third storage area, the scanning being performed with the distributed server cluster on the basis of division units determined in the dividing policy; and comparing the results of the distributed scans, and creates and outputs a list of files that are added, deleted, or changed after the creation of the index information.

7. The file list generation system according to claim 5, wherein the determining of the dividing policy includes:

determining a dividing policy of setting the number of division units as one to perform a search target directory scanning operation when the number of directories counted from the highest layer of directories of search target files is smaller than a predetermined number, performing a first scan, with each one division unit being layers from a directory in the highest layer to a predetermined layer when the number of directories counted from the highest layer exceeds the predetermined number, and determining a dividing policy to scan lower layers of scan target directories that are found through the first scan, with each one division unit being a depth of one layer.

8. The file list generation system according to claim 6, wherein the determining of the dividing policy includes:

determining a dividing policy of setting the number of division units as one to perform a search target directory scanning operation when the number of directories counted from the highest layer of directories of search target files is smaller than a predetermined number, performing a first scan, with each one division unit being layers from a directory in the highest layer to a predetermined layer when the number of directories counted from the highest layer exceeds the predetermined number, and determining a dividing policy to scan lower layers of scan target directories that are found through the first scan, with each one division unit being a depth of one layer.

9. A file list generation device comprising:

a processor; and one or more storage areas connected to the processor and storing instructions that, when executed by the processor, instruct the processor to perform acts including:

acquiring directory URLs of search target files from index information created about the search target files and stored in a first one of the storage areas, counting the number of directories in each layer through analysis of the directory URLs, and determining, based on the counting, a dividing policy to divide a scan target directory scanning operation to be performed with a distributed server cluster;

dividing directories of the search target files in accordance with the dividing policy, acquiring a snapshot of a current directory tree of scan target files, and storing the snapshot into a second one of the storage areas;

scanning, in a distributed manner, the search target files in respective directories in the snapshot of the current directory tree and a snapshot of a directory tree of search target files acquired prior to the determination of the divided policy and stored in in a third one of the storage areas, the scanning being performed with the distributed server cluster on the basis of division units determined by the dividing policy; and comparing the results of the distributed scans, and creating and outputting a list of files that are added, deleted, or changed after the creation of the index information.

10. A file list generation device comprising:

a processor; and one or more storage areas connected to the processor and storing instructions that, when executed by the processor, instruct the processor to perform acts including:

storing index information created about search target files in a first one of the storage areas;

copying a current directory tree of the search target files, and storing the copied current directory tree as a backup directory in a second one of the storage areas;

acquiring directory URLs of the search target files from the index information stored in the first one of the storage areas, counting the number of directories in each layer through analysis of the directory URLs, and, based on the counting, determining a dividing policy to divide a scan target directory scanning operation to be performed with a distributed server cluster;

dividing the backup directory of the search target files in accordance with the dividing policy;

scanning, in a distributed manner, the search target files in respective directories in the backup directory of the current directory tree stored in a second one of the storage areas and a backup directory tree of search target files acquired prior to the determination of the divided policy and stored in a third one of the storage areas, the scanning being performed with the distributed server cluster on the basis of division units determined by the dividing policy; and comparing the results of the distributed scans, and creating and outputting a list of files that are added, deleted, or changed after the creation of the index information.

11. The file list generation device according to claim 9, wherein the determining of the dividing policy includes:

determining a dividing policy of setting the number of division units as one to perform a search target directory scanning operation when the number of directories counted from the highest layer of directories of search target files is smaller than a predetermined number, performing a first scan, with each one division unit being layers from a directory in the highest layer to a predetermined layer when the number of directories counted from the highest layer exceeds the predetermined number, and determining a dividing policy to scan lower layers of scan target directories that are found through the first scan, with each one division unit being a depth of one layer.

12. The file list generation device according to claim 10, wherein the determining of the dividing policy includes:

determining a dividing policy of setting the number of division units as one to perform a search target directory scanning operation when the number of directories counted from the highest layer of directories of search target files is smaller than a predetermined number, performing a first scan, with each one division unit being layers from a directory in the highest layer to a predetermined layer when the number of directories counted from the highest layer exceeds the predetermined number, and determining a dividing policy to scan lower layers of scan target directories that are found through the first scan, with each one division unit being a depth of one layer.

13. A non-transitory computer readable medium storing instructions that, when executed by a processor, instruct the processor to perform acts comprising:

acquiring directory URLs of search target files from index information created about the search target files and stored in a first storage area, counting the number of directories in each layer through analysis of the directory URLs, and, based on the counting, determining a dividing policy to divide a scan target directory scanning operation to be performed with a distributed server cluster;

dividing directories of the search target files in accordance with the dividing policy, acquiring a snapshot of a current directory tree, and storing the snapshot into a second storage area;

scanning, in a distributed manner, the search target files in respective directories in the snapshot of the current directory tree and a snapshot of a directory tree of search target files acquired prior to the determination of the divided policy and stored in a third storage area, the scanning being performed with the distributed server cluster on the basis of division units determined by the dividing policy; and comparing the results of the distributed scans, and creating and outputting a list of files that are added, deleted, or changed after the creation of the index information.

14. A non-transitory computer readable medium storing instructions that, when executed by a processor, instruct the processor to perform acts comprising:

storing index information created about search target files in a first one of a plurality of storage areas storing a copy of a current directory tree of search target files as a backup directory into a second one of the storage areas;

acquiring directory URLs of the search target files from the index information created about the search target files and stored in the first one of the storage areas, counting the number of directories in each layer through analysis of the directory URLs, and, based on the counting, determining a dividing policy to divide a scan target directory scanning operation to be performed with a distributed server cluster;

dividing the backup directory of the search target files in accordance with the dividing policy;

scanning, in a distributed manner, the search target files in respective directories in the backup directory of the current directory tree stored in the second one of the storage areas and a backup directory tree of search target files acquired prior to the determination of the divided policy and stored in a third one of the storage areas, the scan being performed with the distributed server cluster on the basis of division units determined by the dividing policy; and comparing the results of the distributed scans, and creating and outputting a list of files that are added, deleted, or changed after the creation of the index information.

15. The file list generation program according to claim 13, wherein the determining of the dividing policy includes:

determining a dividing policy of setting the number of division units as one to perform a search target directory scanning operation when the number of directories counted from the highest layer of directories of search target files is smaller than a predetermined number, performing a first scan, with each one division unit being layers from a directory in the highest layer to a predetermined layer when the number of directories counted from the highest layer exceeds the predetermined number, and determining a dividing policy to scan lower layers of scan target directories that are found through the first scan, with each one division unit being a depth of one layer.

16. The file list generation program according to claim 14, wherein the determining of the dividing policy includes:

determining a dividing policy of setting the number of division units as one to perform a search target directory scanning operation when the number of directories counted from the highest layer of directories of search target files is smaller than a predetermined number, performing a first scan, with each one division unit being layers from a directory in the highest layer to a predetermined layer when the number of directories counted from the highest layer exceeds the predetermined number, and determining a dividing policy to scan lower layers of scan target directories that are found through the first scan, with each one division unit being a depth of one layer.

* * * * *